United States Patent
Baba et al.

(10) Patent No.: US 7,562,564 B2
(45) Date of Patent: Jul. 21, 2009

(54) SCANNING PROBE MICROSCOPE AND SAMPLE OBSERVING METHOD USING THIS AND SEMICONDUCTOR DEVICE PRODUCTION METHOD

(75) Inventors: Shuichi Baba, Yokohama (JP);
Toshihiko Nakata, Yokohama (JP);
Masahiro Watanabe, Yokohama (JP);
Takeshi Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 10/542,624

(22) PCT Filed: Jan. 29, 2004

(86) PCT No.: PCT/JP2004/000821

§ 371 (c)(1),
(2), (4) Date: Jul. 19, 2005

(87) PCT Pub. No.: WO2004/074816

PCT Pub. Date: Sep. 2, 2004

(65) Prior Publication Data

US 2006/0113469 A1    Jun. 1, 2006

(30) Foreign Application Priority Data

Jan. 30, 2003 (JP) .............................. 2003-022086

(51) Int. Cl.
*G01N 13/16* (2006.01)
*G12B 21/20* (2006.01)
*G01N 13/10* (2006.01)

(52) U.S. Cl. ........................................................ 73/105
(58) Field of Classification Search ................... 73/105; 250/306, 307
See application file for complete search history.

(56) References Cited

U.S. PATENT DOCUMENTS 5,331,275 A * 7/1994 Ozaki et al. ................. 324/757

(Continued)

FOREIGN PATENT DOCUMENTS

JP    2-28113    1/1990

(Continued)

OTHER PUBLICATIONS

Shuichi Baba, Masahiro Watanabe, Toshihiko Nakata, Tetsuya Nishida, "Step in mode AFM no Kosokuka no Kento", 2003 Nen (Heisei 15 Nen), Shuki Kai 64 Kai, Extended abstracts; the Japan Society of Applied Physics, Separate vol. 2, Aug. 30, 2003, p-ZD-6, p. 609.

(Continued)

*Primary Examiner*—Daniel S Larkin
(74) *Attorney, Agent, or Firm*—Antonelli, Terry, Stout & Kraus, LLP.

(57) ABSTRACT

A scanning probe microscope capable of measuring accurate 3-D shape information of a sample with high through-put without damaging a sample. In a method for acquiring an accurate 3-D shape of a sample without imparting damage to the sample by bringing a probe into contact at only a measurement point, once pulling up and retracting the probe when it moves towards a next measurement point, moving the probe towards the next measurement point and allowing it to approach, a deflection signal of the probe and its twist signal area analyzed so that measurement can be made at a minimum necessary retraction distance. Control for minimizing residual oscillation at the time of transverse movement is made so that a measurement frequency can be raised and high speed measurement can be accomplished.

7 Claims, 25 Drawing Sheets

U.S. PATENT DOCUMENTS

| | | | | |
|---|---|---|---|---|
| 5,965,881 | A * | 10/1999 | Morimoto et al. | 250/234 |
| 6,578,410 | B1 * | 6/2003 | Israelachvili | 73/105 |
| 6,677,697 | B2 * | 1/2004 | Struckmeier et al. | 310/328 |
| 6,838,889 | B2 * | 1/2005 | Su et al. | 324/750 |
| 6,856,145 | B2 * | 2/2005 | Pelz et al. | 324/663 |
| 6,952,952 | B2 * | 10/2005 | Hinterdorfer et al. | 73/105 |
| 7,129,486 | B2 * | 10/2006 | Spizig et al. | 250/311 |
| 2002/0092982 | A1 * | 7/2002 | Jhe et al. | 250/306 |

FOREIGN PATENT DOCUMENTS

| | | |
|---|---|---|
| JP | 4-369407 | 12/1992 |
| JP | 5-251524 | 9/1993 |
| JP | 6-74754 | 3/1994 |
| JP | A-07-83650 | 3/1995 |
| JP | 7-134137 | 5/1995 |
| JP | A-07-134137 | 5/1995 |
| JP | A-8-248040 | 9/1996 |
| JP | 10-142240 | 5/1998 |
| JP | 10-223170 | 8/1998 |
| JP | 2868047 | 12/1998 |
| JP | 11-352135 | 12/1999 |
| JP | A-2000-36139 | 2/2000 |
| JP | 2000-162115 | 6/2000 |
| JP | 3078354 | 6/2000 |
| JP | 2000-276862 | 10/2000 |
| JP | 2000-352697 | 12/2000 |
| JP | A-2000-352697 | 12/2000 |
| JP | 2001-33373 | 2/2001 |
| JP | A-2001-33374 | 2/2001 |
| JP | 2001-228071 | 8/2001 |
| JP | 2001-324438 | 11/2001 |
| JP | 2003-202284 | 7/2003 |
| JP | 2004-125540 | 4/2004 |

OTHER PUBLICATIONS

Japanese Office Action, dated Jan. 8, 2008 for Application No. 2003-022086 with partial translation.

* cited by examiner

DRIVING SIGNAL AND STAGE DRIVING WAVEFORM (a)

(b)

(c)

(a)

(b)

(a)  (b)

(c)

(d)  (e)

(a)

(b)

PROBE FRONT VIEW

STANDARD SAMPLE A (HEMISPHERICAL TYPE)

STANDARD SAMPLE B (PYRAMIDAL TYPE)

STANDARD SAMPLE C (STEP TYPE)

STANDARD SAMPLE A (HEMISPHERICAL TYPE)

STANDARD SAMPLE B (PYRAMIDAL TYPE)

STANDARD SAMPLE C (STEP TYPE)

SCANNING PROBE MICROSCOPE AND SAMPLE OBSERVING METHOD USING THIS AND SEMICONDUCTOR DEVICE PRODUCTION METHOD

TECHNICAL FIELD

This invention relates to a scanning probe microscope technology, a sample observation method using this and a device/optical recording media production method. More particularly, the invention relates to a technology that will be effective when it is applied to specification of a measurement area and correction of the measurement result.

BACKGROUND ART

A scanning probe microscope (SPM) is known as a measuring technology of fine three-dimensional shapes. This is a technology that scans a sample while a probe whose tip is pointed is controlled and contact force is kept at an extremely small value, and has widely been employed as a technology capable of measuring fine three-dimensional shapes in an atomic order. Various improvements have been made in the past to solve the problem inherent to the scanning probe microscope in that it is difficult to increase a speed for physically scanning the sample.

For example, JP-A-10-142240 and JP-A-2000-162115 disclose a technology for correcting shape data from both deflection signal of a probe and driving signal of a sample to simultaneously satisfy high speed and resolution. In order to bring at a high speed the probe close to the sample, JP-A-6-74754 discloses a technology that brings at a high speed a probe close to a sample by utilizing the fact that when the probe is allowed to approach the sample while being oscillated, the probe can be constituted in such a manner that amplitude of the probe decreases from a position spaced apart by about 5 micro-meter due to acoustic interaction. However, the technologies described above involve the problem that only a scanning probe microscope apparatus having the construction for oscillating the probe can be used and the problem that because proximity cannot be detected unless the probe approaches the sample at about several micro-meters, another sensor becomes necessary to bring at a high speed the probe to the distance of several micro-meters.

On the other hand, existing fine pattern formation processes of LSI conduct dimensional management by using CD-SEM (measuring SEM, CD: Critical Dimension) but the following problems to be solved exist with miniaturization of patterns.

(1) Problem of measurement accuracy:

Gate width of 90 nm node LSI, which is expected to become predominant in 2003, is 80 mm, and required measurement accuracy is 1.6 mm when allowable dispersion is 10% and measurement accuracy is its 20%.

(2) Requirement of profile measurement:

Needs for APC (Advanced Process Control) have increased for high precision control of line width. For this purpose, a measurement technology of not only the pattern line with but also a sectional shape exerting great influences on electrical characteristics is necessary.

(3) Problem of measurement objects:

Measurement needs for materials having low electron beam resistance such as DUV (deep UV) resists, low-k (low dielectric constant) film materials, etc, have increased.

(4) The necessity for APC (Advanced Process Control) has increased for high precision control of the line width and for this purpose, a measurement technology not only of the pattern line width but also a sectional shape exerting great influences on electrical characteristics is necessary.

(5) Similar needs such as similar measurement accuracy, the necessity of profile measurement and measurement of a resist pattern for preparing a master are assumed for the measurement of pits of a high density optical disk memory of the next generation.

Existing CD-SEM cannot cope with the problems described above. Therefore, a scanning probe microscope technology is believed promising. It is a scanning probe microscope technology capable of increasing the probe approach speed described above, less damaging a soft and brittle material and capable of acquiring information of surface materials that becomes necessary in this case.

In contrast, JP-A-11-352135 discloses a method for reducing damage of a soft and brittle material by oscillating a sample or a probe at constant amplitude and conducting scanning while the probe is allowed to periodically impinge against the sample.

Further, JP-A-2001-33373 discloses a scanning method which applies servo of a probe at only sporadic measurement points to measure a height and moves the probe towards the next measurement point while the probe is pulled up. According to this method, the number of times of contact is small and damage to the soft and brittle material and the probe is less. Because the probe is not dragged, there is the advantage that the shape at a step portion can be measured with fidelity. From the aspect of the higher speed, however, high speed measurement cannot be made because retraction and approach of the probe is repeated for each measurement point.

However, when the atomic force microscope (AFM) is used for CD/sectional profile measurement in the semiconductor production lines, there are many problems to be solved such as through-put, specification and positioning of the measurement area, distortion of the measurement image resulting from scanning accuracy of an XY stage or variance of the probe shape and probe wear, and so forth.

As for positioning of the measurement area among the problems when the atomic force microscope (AFM) is used for the CD measurement, a method that assembles an optical microscope having high magnification in AFM has been used at present and positioning by the optical microscope image is conducted (refer to JP-A-2-28113 (Summary on page 1, etc), for example).

As a method of sample observation other than the optical microscope, a composite apparatus of a scanning electron microscope and an atomic force microscope (AFM) has been considered (refer to JP-A10-223170 (Summary on page 1, etc), for example).

Further, the method disclosed in JP-A-2-28113 described above involves the problem that accurate positioning of the measurement area becomes impossible in future because resolution of patterns by using the optical microscope becomes more difficult with further miniaturization of the patterns.

In the technology described in JP-A-10-223170 described above, the apparatus becomes large in scale and damage to samples having low electron beam resistance is feared. Another problem is that the operation of monitoring the probe shape and the wear amount of the probe due to the measurement and judging the probe exchange timing or eliminating the influences on the measurement profile distortion due to the probe shape difference and the probe wear becomes an unavoidable operation for conducting highly accurately the CD measurement.

As explained above, the prior art technologies have the problems how to simultaneously satisfy the measurement not damaging the sample and the high speed measurement.

DISCLOSURE OF THE INVENTION

It is an object of the invention to accomplish high speed measurement by using a measurement method capable of high speed measurement without damaging a sample, and repeating retraction/approach of a probe at each measurement point.

It is another object of the invention to accomplish production of stable and high precision devices by measuring a pattern of a semiconductor sample and feeding it back to a process condition.

It is another object of the invention to accomplish production of stable and high precision recording media by measuring patterns of recording media and feeding them back to a process condition.

Furthermore, the invention is completed to solve the problems described above and to provide a scanning probe microscope, particularly an atomic force microscope (AFM) as one of the scanning probe microscopes, that can accurately specify and position a measurement area of a sample having a fine pattern which has been difficult to observe through an optical microscope, and can correct measurement profile distortion resulting from variance of a probe shape or probe wear on the basis of the condition of the probe shape and probe wear.

To solve the problems described above, a scanning microscope according to a first invention analyzes a sensor signal to suppress a probe retraction amount to a minimum level and uses a driving pattern for quickly completing transverse movement of a probe by using a measurement method capable of high precision measurement without damaging a sample and repeating retraction/approach of the sample, and accomplishes high speed measurement by using means for changing a control method of approach and contact of the probe.

A scanning probe microscope according to a second invention accomplishes formation of a stable and high precision pattern by measuring the pattern of a semiconductor sample or an optical recording medium and feeding back the result to a process condition.

Further, the invention accomplishes a scanning probe microscope capable of high speed approach of a probe to a sample by using a proximity sensor having high sensitivity by optical height detection.

A scanning probe microscope according to a third invention accomplishes measurement of an accurate shape of a step potion by conducting scanning by inclining a probe to a sample step portion having acute inclination.

In a scanning probe microscope for measuring a surface shape of a sample by scanning a probe by bringing the probe close to, or into contact with, a sample surface and measuring a physical interaction occurring between the probe and the sample, a scanning probe microscope according to a fourth invention includes measurement area specifying means for specifying a measurement area of the sample on the basis of the image of the sample surface, and measurement shape correction means for correcting the measurement result of the sample surface on the basis of the condition of the probe.

In the scanning probe microscope of the fourth invention, the measurement area specifying means in a scanning probe microscope according to a fifth invention specifies the measurement area of the sample on the basis of a scanning probe microscope image, near-UV range microscope image or far-UV range microscope image of the sample surface.

In the scanning probe microscope of the fifth invention, the canning probe microscope image in a scanning probe microscope according to a sixth invention is an atomic force microscope image or near-field light image of the sample surface.

In the scanning probe microscope of the fifth or sixth invention, a scanning probe microscope according to a seventh invention includes a measurement area specifying probe for measuring a scanning probe microscope image or atomic force microscope image of the sample surface.

In the scanning probe microscope of the seventh invention, a scanning probe microscope according to an eighth invention includes distance measurement means for measuring a distance between a probe for measuring a surface shape of the sample and the measurement area specifying probe on the basis of the measurement result of the sample having a distance measurement pattern.

In the scanning probe microscope of the fifth invention, a scanning probe microscope according to a ninth invention includes distance measurement means for measuring a distance between a probe for measuring a surface shape of the sample and a microscope for measuring a near-UV microscope image or far-UV range microscope image on the basis of the measurement result of the sample having a distance measurement pattern.

In a scanning probe microscope of the fourth, fifth, sixth, seventh, eighth or ninth invention, a scanning probe microscope according to a tenth invention includes a standard sample having a known shape, and a probe condition detection means for detecting a condition of the probe on the basis of the measurement result of the standard sample, wherein the measurement shape correction means corrects the measurement result of the sample surface on the basis of the condition of the probe detected by the probe condition detection means.

In a scanning probe microscope of the tenth invention, the probe condition detection means in a scanning probe microscope according to an eleventh invention establishes matching between a measurement profile library determined from an arbitrary probe condition created in advance by simulation and the standard sample shape and an actual measurement value, and specifies said probe condition on the basis of the matching result.

A CD/sectional profile measurement method according to a twelfth invention measures a surface shape of a semiconductor pattern by using the scanning probe microscope according to the fourth, fifth, sixth, seventh, eighth, ninth, tenth or eleventh invention, and measures a CD/sectional profile of the semiconductor pattern on the basis of the measurement result.

In a semiconductor device production method for producing semiconductor devices by using a plurality of process apparatuses, a semiconductor device production method according to a thirteenth invention measures a surface shape of a semiconductor pattern of semiconductor devices during or after production by using the scanning probe microscope according to the fourth, fifth, sixth, seventh, eighth, ninth, tenth or eleventh invention, measures a CD/sectional profile of the semiconductor pattern on the basis of the measurement result, and changes operating conditions of the process apparatuses on the basis of the measurement result.

Other objects, features and advantages of the invention will become apparent from the description of the following embodiments of the invention in conjunction with the accompanying drawings.

EMBODIMENT OF THE INVENTION

Hereinafter, the invention will be explained by using the drawings.

Figure 1:
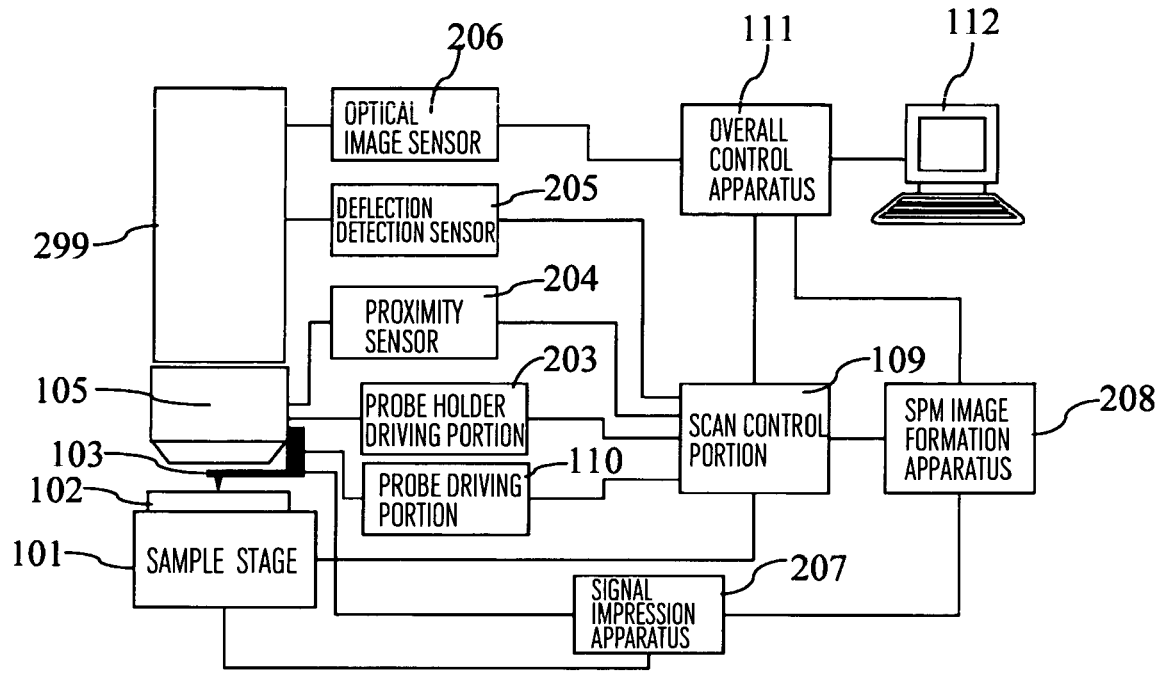
FIG. 1 is a view showing an overall construction of a scanning probe microscope.
Figure 2:
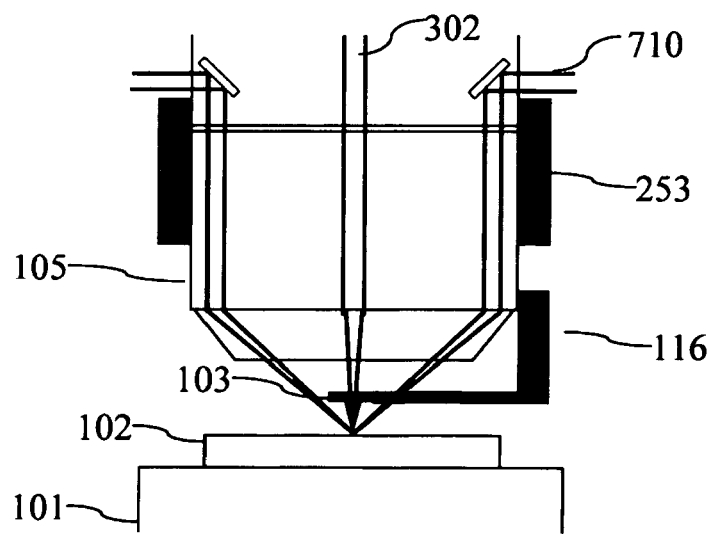
FIG. 2 is an enlarged view of a portion near a probe in an embodiment.

FIG. 1 is a view showing a construction of a scanning probe microscope according to the invention. FIG. 2 is an enlarged view of a portion around a probe in an embodiment. A sample 102 is put on a sample stage 101 that can be driven in X, Y and Z directions. The sample stage is controlled by a scanning control portion 109. A probe 103 exists above the scan control portion 109. A probe moving mechanism 116 to which the probe 103 is fitted is driven by control from a probe driving portion 110 in the X, Y and Z directions and conducts probe scanning of the scanning probe microscope.

The probe moving mechanism 116 is fitted to a probe holder 105. The probe holder 105 is fitted to a barrel 299 by a probe holder up/down mechanism 253 and is roughly driven and moved in the Z direction under control from a probe holder driving portion 203. A probe moving mechanism 116 is a fine movement mechanism and does not have a large operation distance. Therefore, approach of the probe toward the sample is executed by the probe holder up/down mechanism 253. Alternatively, the sample stage 101 side may be driven so as to allow the probe to approach toward the sample as another embodiment. Probe scanning of the scanning probe microscope, too, may be executed by driving the sample stage 101 side.

A proximity sensor 204 is a sensor for measuring the height of the probe near its tip with high sensitivity. When contact of the probe with the sample is detected in advance and an approaching speed is controlled, high speed approach to the sample can be accomplished without allowing the probe to collide against the sample.

The proximity sensor 204 may use light as will be later described but other sensors may also be used as long as they have a detection range of dozens of micrometers and can detect the distance from the sample with a sensitivity of about 1 micrometer. An electrostatic capacitance type sensor that applies an AC voltage between the sample stage 101 or the cantilever portion of the probe 103 and the sample 102, measures an electrostatic capacitance and detects the distance and an air micro-sensor that causes air to flow between the sample stage 101 and the sample 102 and detects a pressure, for example, may be used.

The scanning control portion 109 controls the probe deflection detection sensor 205, the proximity sensor 204, the probe holder driving portion 203, the probe driving portion 110 and the sample stage 101 and accomplishes the approach of the probe and scanning of the sample. The signal at the time of scanning of the sample is sent to an SPM image formation apparatus 208 and a surface shape image of the sample can be acquired.

A signal impression apparatus 207 measures elasticity of the surface of the sample by oscillating the probe at a high frequency and detecting its response by the deflection detection sensor 205, or measures a current by applying a DC voltage across the probe and the sample and measures the capacitance or the resistance. This operation is conducted simultaneously with scanning of the probe and when the SPM image formation apparatus 208 processes the resulting signal, a distribution image of an additional property can be acquired besides the surface shape image.

When the probe holder 105 is cylindrical and an objective lens is assembled into the cylindrical shape, an optical image of the sample can be acquired by the optical image sensor 206. Therefore, the optical image of the sample can be simultaneously observed in the SPM measurement area. The optical image of the sample can be used for the fitting position adjustment of the probe when the probe 103 is fitted.

The operation of the entire apparatus is controlled by an overall control apparatus 111 and acceptance of an instruction from an operator and submission of the optical image and the SPM image can be made by a display/input device 112.

Figure 3:
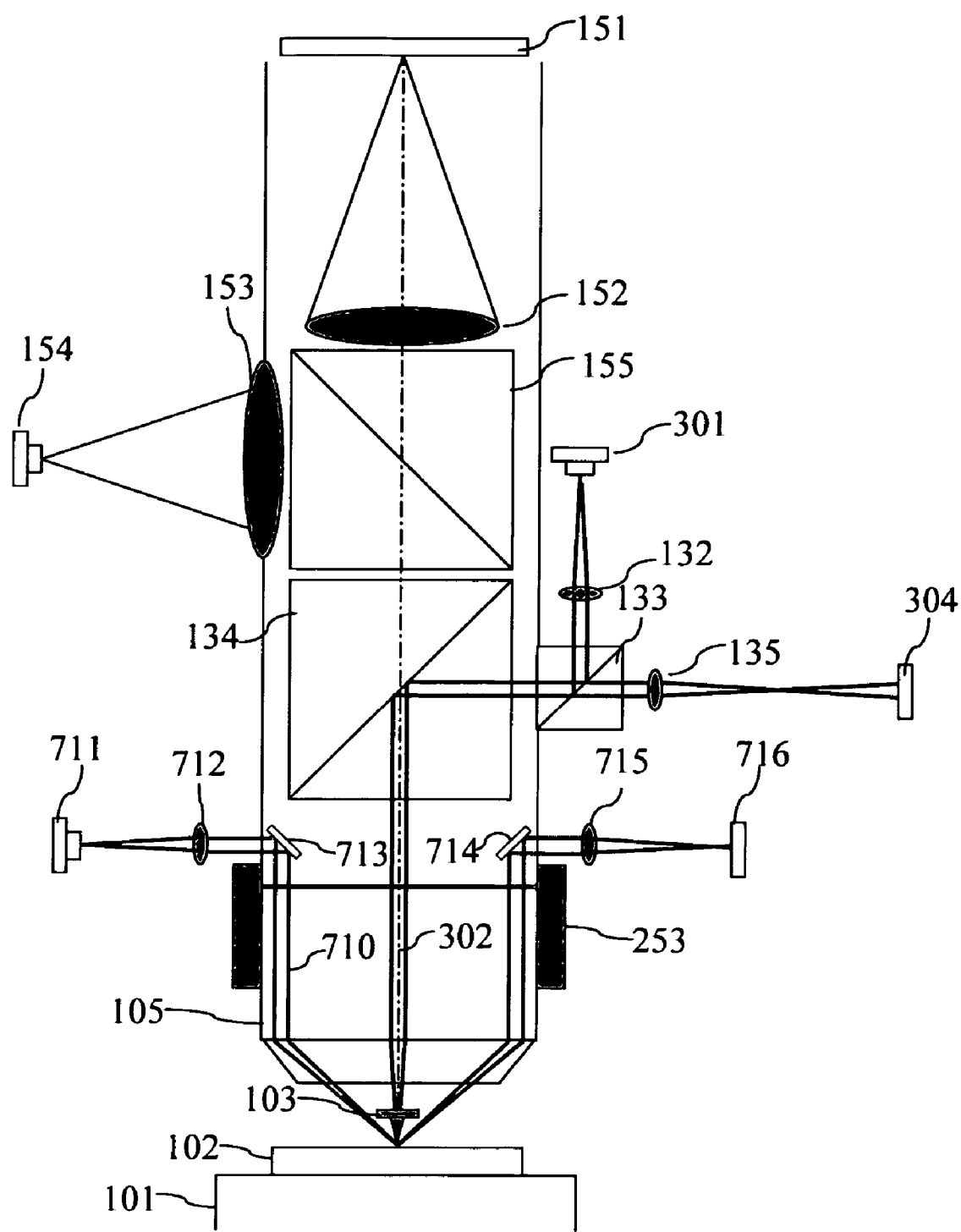
FIG. 3 is a view showing an example of an optical system.

FIG. 3 is a view showing an example of the optical system. Light outgoing from a light source 711 is changed to parallel rays of light by a lens 712, is reflected by a mirror 713, is incident into an objective lens (not shown in the drawing) assembled in the probe holder 105 and forms a focus on the sample 102. An image having an arbitrary shape such a spot or a slit can be formed depending on the shape of an aperture assembled into the light source 711.

Light reflected by the sample again passes through the objective lens, is reflected by a mirror 714 and forms an image on a detector 716 by an imaging lens 715. The position of the image moves depending on the height of the sample 102. The moving distance is given by $2mZ \tan \theta$ when the incident angle of detection light 710 to the sample is $\theta$, magnification of image formation by the lens 715 is m and the height of the sample is Z. Therefore, the height Z of the sample can be calculated by measuring this moving distance. The detector 716 may be PSD (Position Sensitive Device) or a split type photodiode linear image sensor because it is necessary for them to be capable of detecting the position of the image.

The explanation given above explains the construction in which detection light 710 passes through the objective lens, but another construction in which detection light 710 passes by the outside of the objective lens, is bent by another mirror, not shown, and forms the image on the sample may be conceivable. At this time, the lenses 712 and 715 are adjusted so that the light source 711 and the sensor 716 establish the image formation relation with the sample 102, respectively. The moving distance of the image on the sensor 716 in this case is $2mZ \sin \theta$.

The probe deflection detection system will be hereinafter explained. Light emitted from a light source 301 passes through a lens 132 and after an optical path is changed by a beam splitter 133, light is incident into a beam splitter 134. After this beam splitter 134 again changes the optical path, light is incident into an objective lens (not shown in the drawing), passes through this objective lens and is irradiated to a cantilever portion 103 of the probe. Light reflected here returns through the same path, passes through the beam splitter 133 and is irradiated to a sensor 304 through a lens 135.

The lens 135 is constituted in such a fashion that an exit pupil of the objective lens and the sensor 304 have an image formation relation and according to this construction, a position change proportional to the tilt of the reflecting surface of the cantilever is induced in light on the sensor 304. When this light is detected by a PSD (Position Sensitive Device), split type photodiode, linear image sensor, etc, arranged at the position of 304, the inclination (deflection) of the cantilever can be detected. Twist can be detected simultaneously with deflection by using any of a two-dimensional type PSD, an image sensor and a 4-split photodiode. To isolate detected light 130 from light of the sample observation system, the light source 301 is a monochromatic laser and interference filters are preferably disposed in front and at the back of the lens 135 so as to allow the passage of only this light.

To further improve efficiency, a dichroic mirror may be used in place of the beam splitter 134. A polarization beam splitter may also be used in place of the beam splitter 133 so that the polarizing direction of the laser 301 can be set to S polarization reflected by 133. A 1/4 wavelength plate (not shown in the drawing) may be interposed between the beam splitters 133 and 134 so as to change S polarization to circular polarization of light and to irradiate it to the reflecting surface of the probe 103, and reflected light is again changed to P polarization by the 1/4 wavelength plate and is allowed to pass through the polarization beam splitter 133.

In the sample observation system, light outgoes from an illumination light source 154, passes through a condenser lens 153, is reflected by a beam splitter 155, passes through the beam splitter 134, passes through the objective lens inside the probe holder 105 and illuminates the sample 102. Reflected light of the sample again passes through the objective lens and then through the beam splitters 134 and 155, forms an image by an image formation lens 152 and is detected by an image sensor 151.

As explained above by using FIG. 3, since the probe, the sample height detection systems 711 to 716, the sample observation system and the probe deflection detection optical system are constituted coaxially, simultaneous observation of the SPM measurement position, easiness of the probe adjustment and high speed approach of the probe and the sample become possible. Since the probe deflection detection optical system is constituted coaxially, detection light 302 can be irradiated to a probe having a small width of the cantilever portion, and high speed scanning becomes possible by using a probe having a smaller weight and a high resonance frequency. Since detection is made through all the objective lenses, the objective lenses can be brought close to the probe and optical observation of the sample with high resolution becomes possible.

On the other hand, it is of course conceivable to employ an embodiment of an off-axis construction in which an objective lens having a long operation distance is used, at least one of the sample height sensor and the probe deflection sensor is passed through a clearance between the objective lens and the sample, and light is projected and detected obliquely. This embodiment will be described later by using FIG. 21.

As another construction, a method of detecting deflection of the probe by using a heterodyne interference method may be conceivable. A point light source having a frequency fo and a point light source having a frequency fo+f shifted by a frequency f are arranged at the position of the light source 301. To arrange the point light sources, the laser may be contracted by a lens or an outgoing end of a fiber may be arranged here. The optical system is adjusted so as to form this image at two points of the probe 103.

Figure 9:
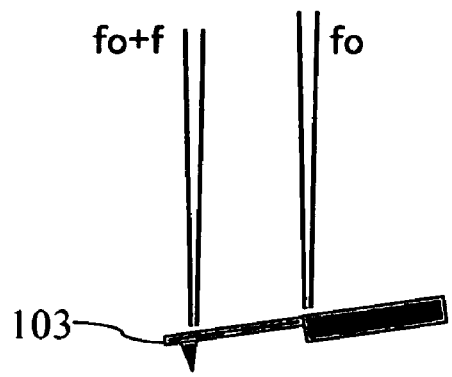
FIG. 9 is a view showing a measurement principle of deflection of the probe by heterodyne interference.

When one of the images is formed at the distal end of the cantilever portion of the probe and the other at the root as shown in FIG. 9, both reflected light intersect at the position of the sensor 304. Therefore, when a photodiode is positioned at 304, two rays of light interfere with each other and generate a beat of the frequency f. The change of a phase results in the change of the inclination of the cantilever when lock-in detection is made for this beat signal to determine the phase by applying the signal of the frequency f to a frequency shifter as the reference. Deflection of the cantilever can be detected in this way. Alternatively, as shown in FIG. 3, it is possible to detect light passing through the beam splitter 133 without being reflected after passing through the lens 132 at a crossing position of two beams by using another photodiode (not shown in the drawing) and to use it as the reference signal having the frequency f.

As still another construction, a device capable of acquiring a signal reflecting the change of strain such as a strain gauge may be assembled in the probe and may be used in place of the optical deflection sensor.

Figure 21:
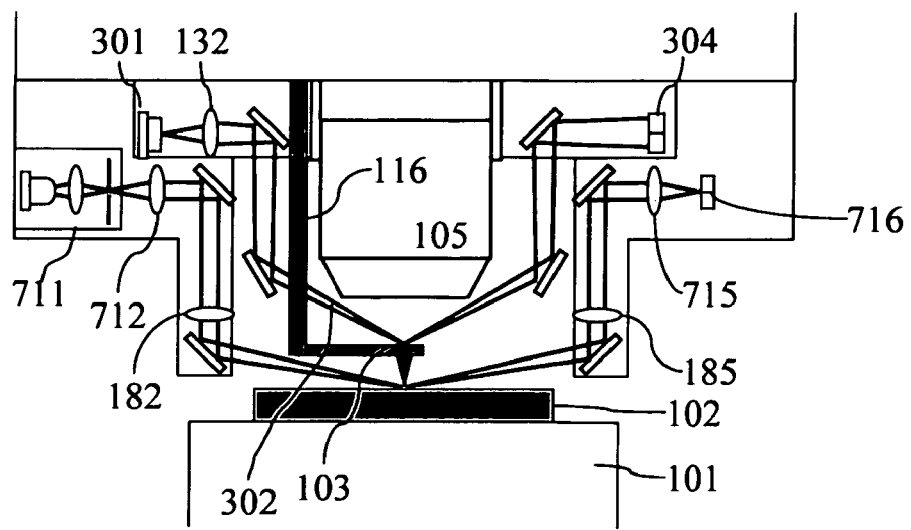
FIG. 21 is a view showing another embodiment of the optical system according to the invention.

FIG. 21 is a view showing another embodiment of the optical system. Light outgoing from a light source 711 is changed to parallel rays of light by a lens 712, is reflected by a mirror, is incident into a lens 182 after reflection by the mirror and forms a focus on the sample 102. An image having an arbitrary shape such as a spot or a slit can be formed depending on the shape of an aperture assembled into the light source 711. After being reflected by the sample, light passes through a lens 185 after reflection by the mirror and forms an image on a detector 716 by an image formation lens 715. The position of the image moves depending on the height of the sample 102. The moving distance is given by $2mZ \sin\theta$ when the incident angle of detection term 710 to the sample is $\theta$, magnification of image formation by the lens 715 is m and the height of the sample is Z. Therefore, the height Z of the sample can be calculated by measuring this moving distance. The detector 716 may be PSD (Position Sensitive Device) or a split type photodiode linear image sensor because it is only necessary for them to be capable of detecting the position of the image.

The probe deflection detection system in the embodiment shown in FIG. 21 is hereinafter explained. Light emitted from a light source 301 passes through a lens 132 and is irradiated to the cantilever portion 103 of the probe after reflection by the mirror. Light reflected here is irradiated to the sensor 304 after reflection by the mirror. Deflection of the cantilever 103 results in the change of the angle of reflected light, so that the position change proportional to the inclination of the reflecting surface of the cantilever is induced in light on the sensor 304. The inclination (deflection) of the cantilever can be detected by detecting this light by a PSD (Position Sensitive Device), a split type photodiode or a linear image sensor positioned at the position of the sensor 304.

When a two-dimensional type PSD, an image sensor or a 4-split photodiode is used, twist can be detected simultaneously with deflection. To isolate this detection light 302 from light of the sample observation system, it is preferred that the light source 301 is a monochromic laser and an interference filter is disposed in front of the detector 304 so as to allow the passage of only this light. Incidentally, reference numeral 105 will denote an objective lens of the sample observation system in the following description.

Figure 8:
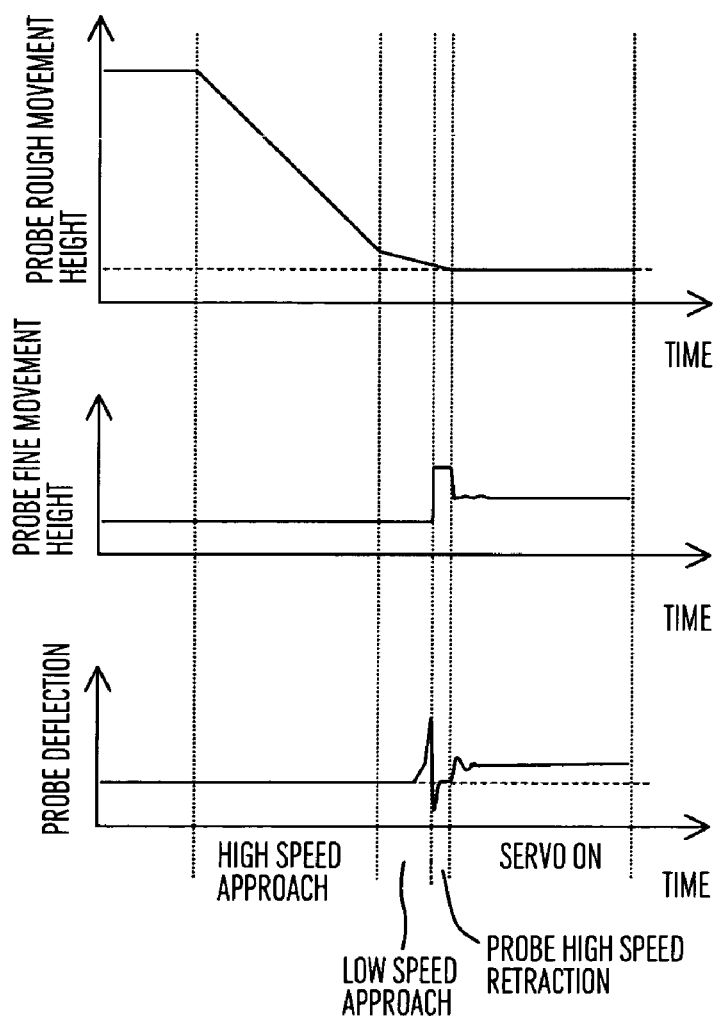
FIG. 8 is a view showing a high speed approach controlling method of a distance between the probe and the sample.

High speed approach control of the probe and the sample using the sample height detection system according to the invention is explained by using FIG. 8. First of all, a probe fine movement mechanism (probe movement mechanism 116) is kept under the stretched state (under the low state of the probe fine movement height). Next, a probe rough movement mechanism (probe holder up/down mechanism 253) is driven at a high speed (about 1 to about 10 mm/s) to lower the probe (to lower the probe rough movement height) while the proximity sensor 204 for detecting the sample height is monitored. Approach is switched to low speed approach (about 0.1 mm/s) when the output of the proximity sensor 204 reaches 10 to dozens of micrometers. The output of the probe deflection detection sensor 205 is monitored and when the output starts increasing, the probe fine movement mechanism is reduced at a stroke (probe high speed retraction shown in FIG. 8). At the same time, the probe rough movement mechanism is stopped.

In an ordinary approach method that sets the probe to an SPM servo mode, the speed at the time of low speed approach cannot be increased easily because of limitation of the control band of the probe. In contrast, when the probe fine movement mechanism is reduced at a stroke at the instant when contact is sensed without setting the mode to the servo mode, the advantage that the speed of low speed approach can be increased is obtained. Thereafter, the probe is slowly brought into the contact state with the sample by turning ON the servo of the probe fine movement mechanism. Incidentally, the explanation described above is made on the assumption that the probe side is driven. Needless to say, however, the explanation holds true of the case where the probe is allowed to approach by driving the sample stage 101 side.

Figure 4:
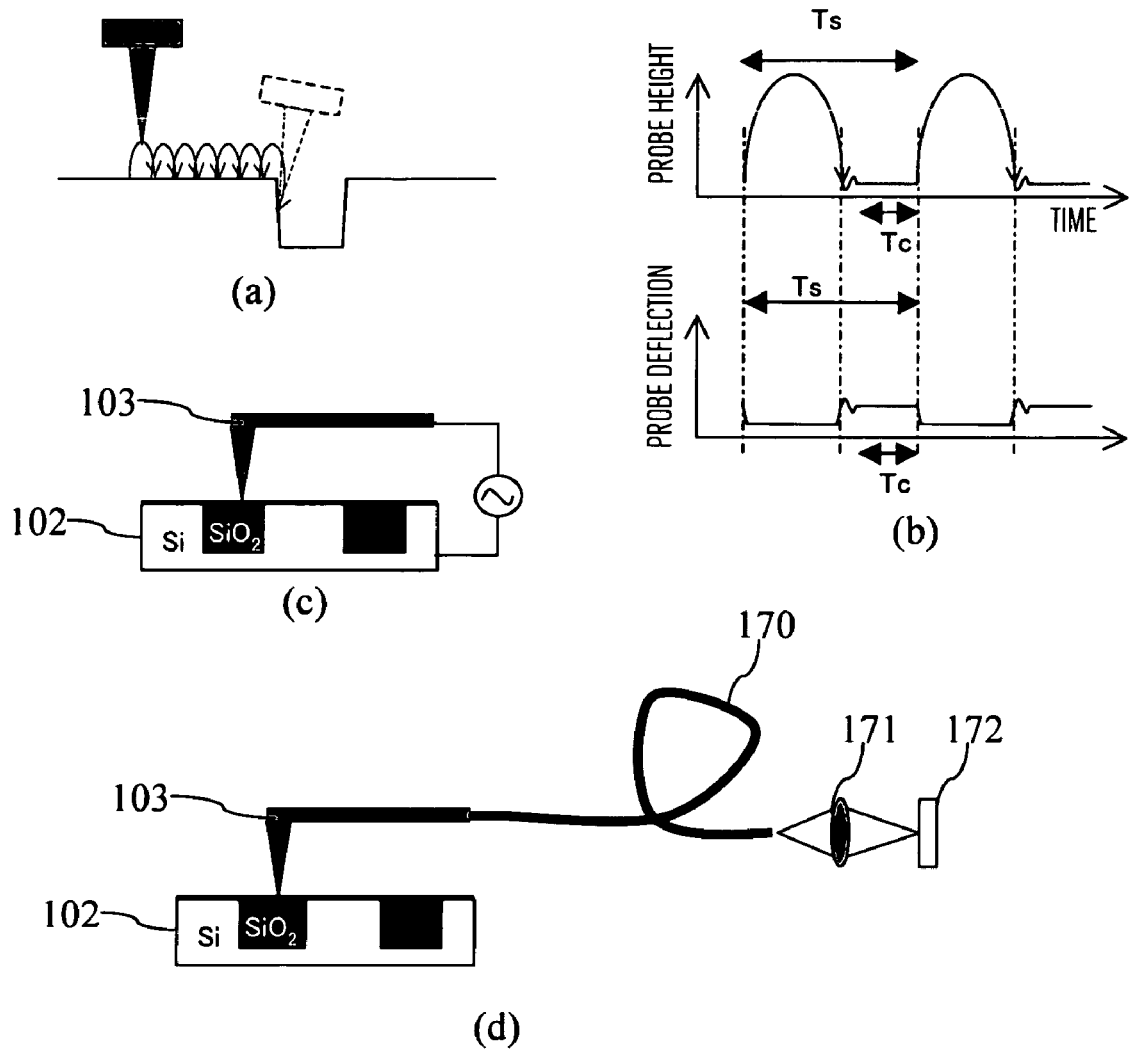
FIG. 4 is a view showing a control method of a probe.

Next, a probe scan mode suitable for the measurement of a soft and brittle material having a high aspect such as a resist pattern is explained by using FIG. 4. A servo application operation (Tc zone) that renders a contact pressure (that is, probe deflection) becomes constant by pulling up and down the probe as shown in (b) is repeated while a relative position between the sample and the probe in the horizontal direction is changed and the sample height is serially measured only at sporadic measurement points. A repetition cycle is Ts. Because the probe does not drag the sample in this way, probe scanning that imparts less damage to the sample and can measure the shape at a step portion with fidelity can be accomplished. This method itself is the one that is disclosed in JP-A-2001-33373, etc, and the following embodiment will be explained as embodiments suitable for measuring the resist pattern, or the like.

Figure 5:
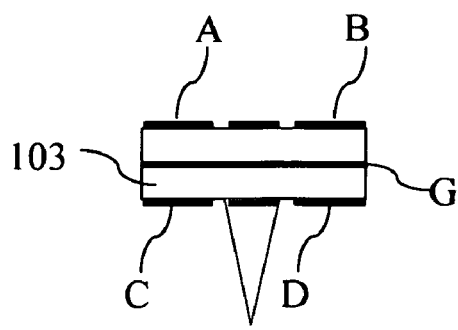
FIG. 5 is a view showing a structure of a cantilever capable of controlling inclination of the probe.

The tip of the probe has a certain taper angle. It has not been possible in the past to correctly measure the shape of the step portion steeper than this taper angle by the scanning probe microscope. When the step is detected, however, the probe is tilted and scanned as represented by dotted lines in FIG. 4(*a*). Methods of tilting the probe include a method that disposes a fine rotation mechanism in the probe holder and a method using a piezoelectric thin film type cantilever shown in FIG. 5 that is described in "T. R. Albrecht, S. Akamine, M. J. Zdeblick, C. F. Quate, J. Vac. Sci. Technol. A8(1), 317(January/February, 1990". It has a so-called "bimorph structure" and includes piezoelectric bodies above and below an intermediate electrode G and electrodes A, B, C and D on the opposite side. Here, twist deformation is induced when a voltage change in a reverse direction is applied to A-G, D-G and B-G, C-G and the probe can be tilted. Twist of the probe can be easily detected by using a 4-split photodiode for the probe deflection detector 304.

Recently, a carbon nano-tube has drawn an attention as a probe material that is thin and has high durability. The carbon nano-tube is a material constituted by cylindrical carbon atoms in the orders of nano-meters to 10 nano-meters. The possibility of correct measurement of the step-like shape by the scanning probe microscope exists when this carbon nanotube is used but there are the problems that measurement of the step overhanging at an angle of 90 degrees or more is not possible and correct measurement cannot be made when the angle of the probe is analogous to that of the step because the probe is attracted to and bent by the sample step portion by static power.

Figure 24:
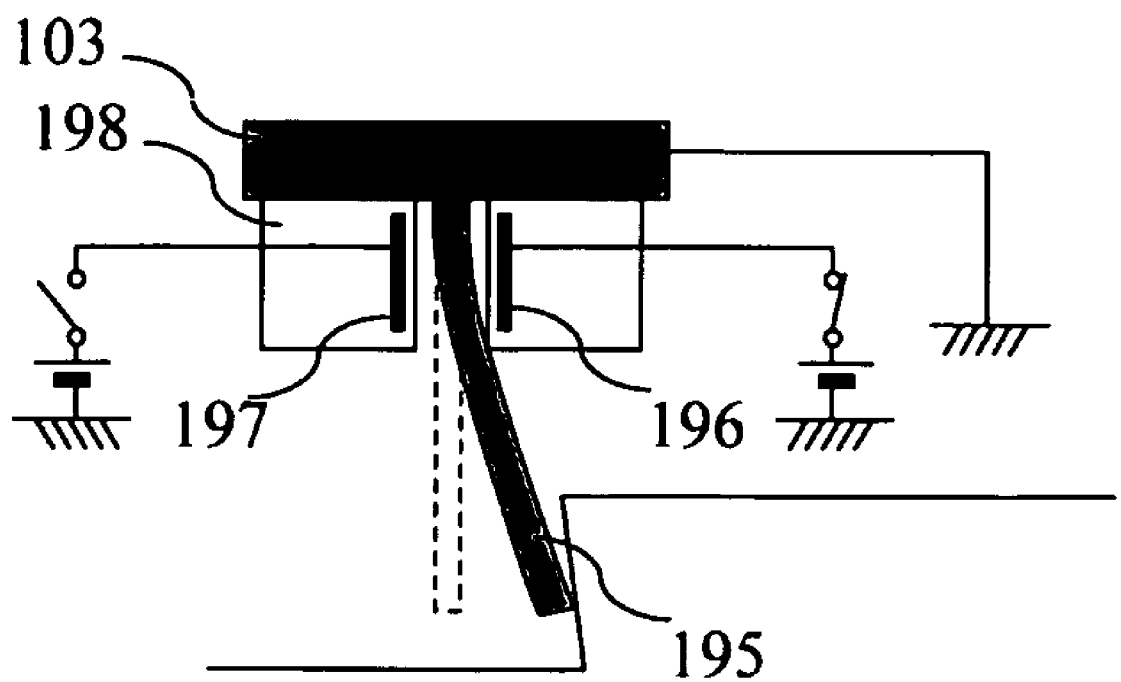
FIG. 24 is a view showing another structure of a cantilever capable of controlling inclination of the probe.

In contrast, an embodiment for correctly measuring the step portion by bending the carbon nano-tube by static power is shown in FIG. 24. Reference numeral 195 denotes the carbon nano-tube. Electrodes 197 and 196 are arranged on the right and left sides of the carbon nano-tube and are covered with an insulator 198. When a voltage is applied to either one of the electrodes 197 and 196, the carbon nano-tube 195 is attracted to and bent by static power.

In the example shown in the drawing, the voltage is applied to the 196 side. Consequently, the steep step portion can be measured correctly.

In the measurement of resist patterns, needs for detecting whether or not a resist remains at the bottom of the resist pattern are high. Needs for knowing the boundary of a material for those patterns concavo-convexities on the surface of which are lost by grinding have become high, too, because a planarization structure has become general in recent semiconductors. To satisfy these needs, technologies for measuring the capacitance of the surface, optical characteristics and the distribution of mechanical properties such as elasticity are necessary simultaneously with measurement of cubic surface shapes.

In the scanning system explained with reference to FIG. 4(b), the period Tc in which the probe keeps contact with the sample surface exists in the measurement cycles Ts. Therefore, measurement of distribution of various properties can be made simultaneously with the surface shape image by conducting the measurement of various surface properties in synchronism with this period.

FIG. 4(c) shows an embodiment in which an AC voltage is applied across the probe and the sample and a local capacitance is measured by synchronously detecting the flowing current.

FIG. 4(d) is an embodiment in which light is allowed to pass through the inside of the probe to illuminate the sample and is guided from the distal end of the probe to a fiber 170 and then to a sensor 172 through a lens 171, and the distribution of local optical characteristics of the sample is determined by detecting optical power in the period Tc.

By so doing, observation and measurement can be made for a planar sample obtained by burying silicon oxide in silicon and ground as shown in FIGS. 4(c) and (d), for example.

Figure 6:
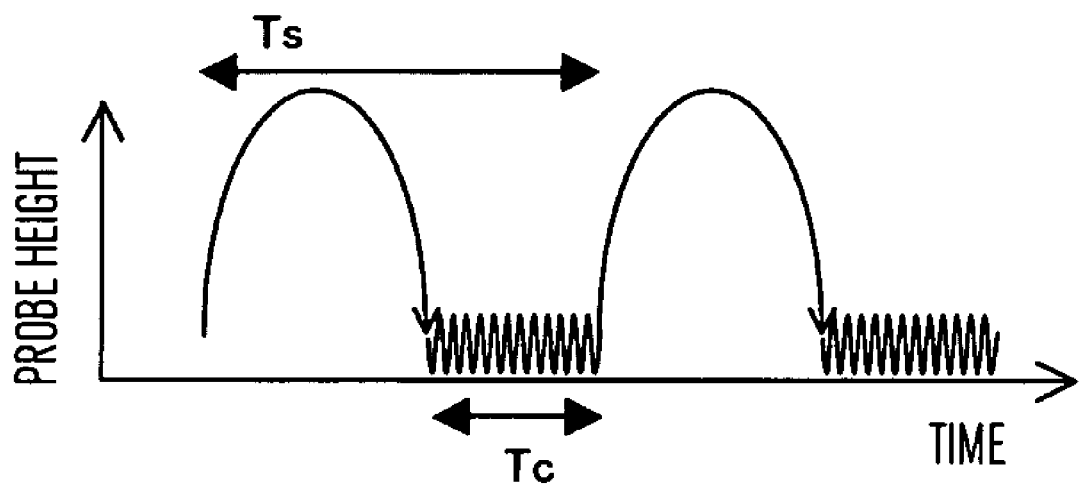
FIG. 6 is a view showing the state where the probe is oscillated during a contact period of a sample and the probe.

Further, FIG. 6 shows an embodiment in which the probe is finely oscillated in a cycle T during the period Tc. It is assumed that T at this time is sufficiently smaller than Ts or Tc. A probe deflection signal is acquired at this time and synchronous detection is made for an oscillation input signal to determine amplitude and phase. In this way, distribution of local mechanical properties of the sample surface can be acquired. The tip of the probe is illuminated, scattered light from the tip or light condensed by an optical system shown in FIG. 4(b) is detected and synchronous detection is made with respect to the oscillation of the probe, so that the distribution of the local optical characteristics of the sample can be determined, too.

Figure 7:
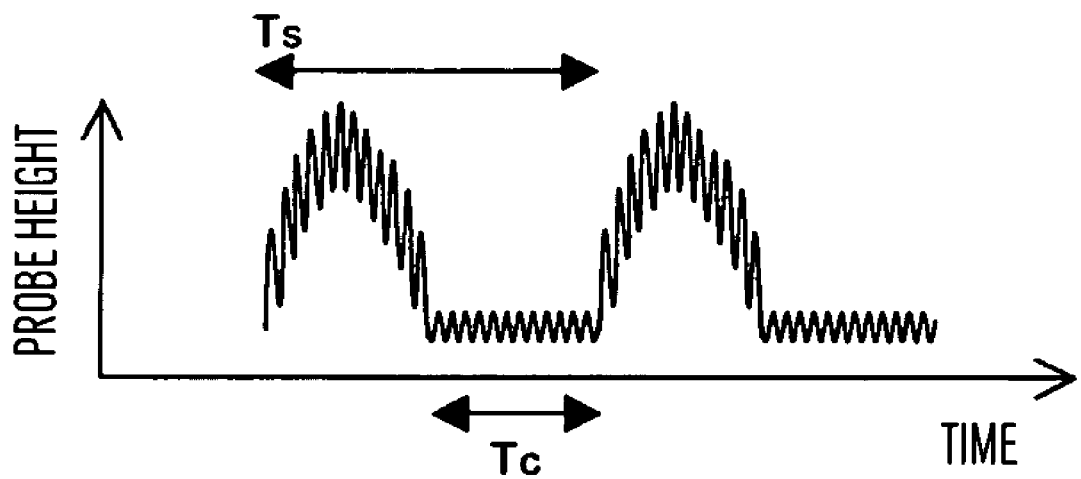
FIG. 7 is a view showing the state where a sample height is measured in a cycle Tc sufficiently slower than a frequency of minute oscillation while fine oscillation is always made at a high frequency.

Alternatively, as shown in FIG. 7, the height of the sample can be detected by oscillating the probe in the cycle T (with the proviso that T<<Tc) and detecting the decrease of the amplitude owing to the contact of the probe with the sample.

Figure 10:
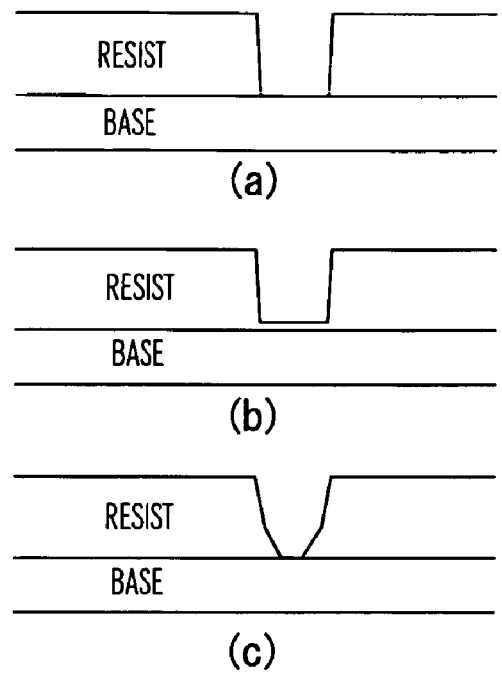
FIG. 10 is a view showing an example of a resist pattern that can be discriminated by the invention.

Next, an example of measurement of a resist pattern is shown by using FIG. 10. In the measurement of the resist pattern, it is necessary to find whether the pattern is vertically cut as shown in (a) or remains thin as shown in (b) or a lower part of a groove or hole is narrowed as shown in (c). According to the invention, it becomes possible to discriminate them.

Figure 11:
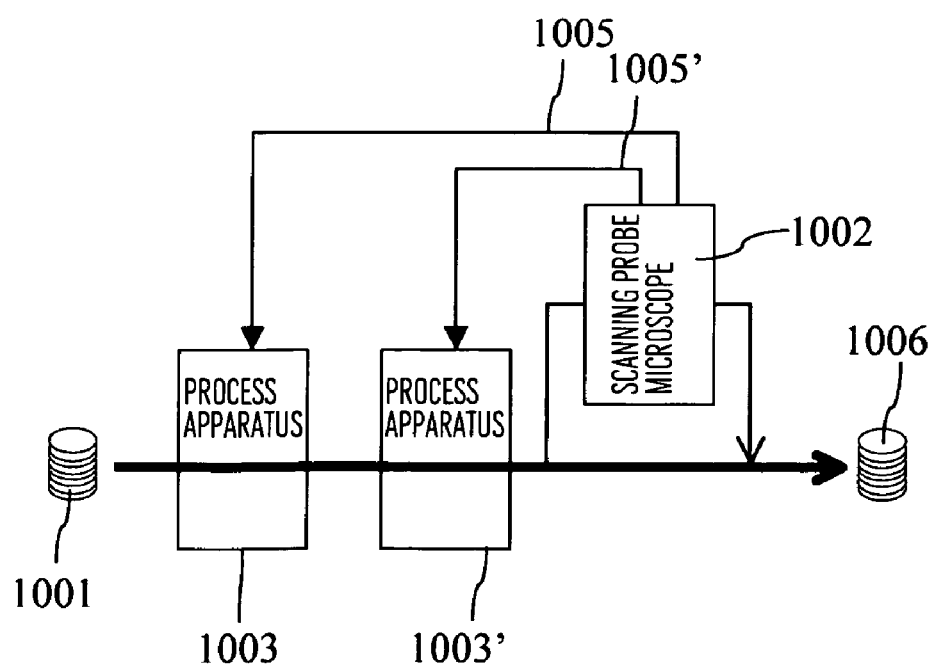
FIG. 11 is a view showing an embodiment of a semiconductor device production method that conducts condition control of a semiconductor process according to the invention.

FIG. 11 further shows a device production method using the present invention. Devices are serially formed by causing a wafer 620 to flow through process apparatuses 1003 and 1003'. The process apparatuses 1003 and 1003' are etchers, CMP apparatuses, exposure devices or developing devices in some cases or other. The pattern formed on the wafer is observed and measured by the scanning probe microscope according to the invention by using a wafer or dummy wafer 1001 sampled out after these process steps. Alternatively, all the wafers may be observed and measured by the scanning probe microscope 1002 because through-put is high. Because the invention can correctly observe and measure the cubic shape of the pattern or the distribution of its surface condition without imparting damage to the sample, high precision devices can be stably produced by feeding back the observation/measurement result to the process condition of the process apparatuses 1003 and 1003'. A dedicated data processing server (not shown in the drawing) may be interposed in some cases into a path 1005 of feedback.

Figure 20:
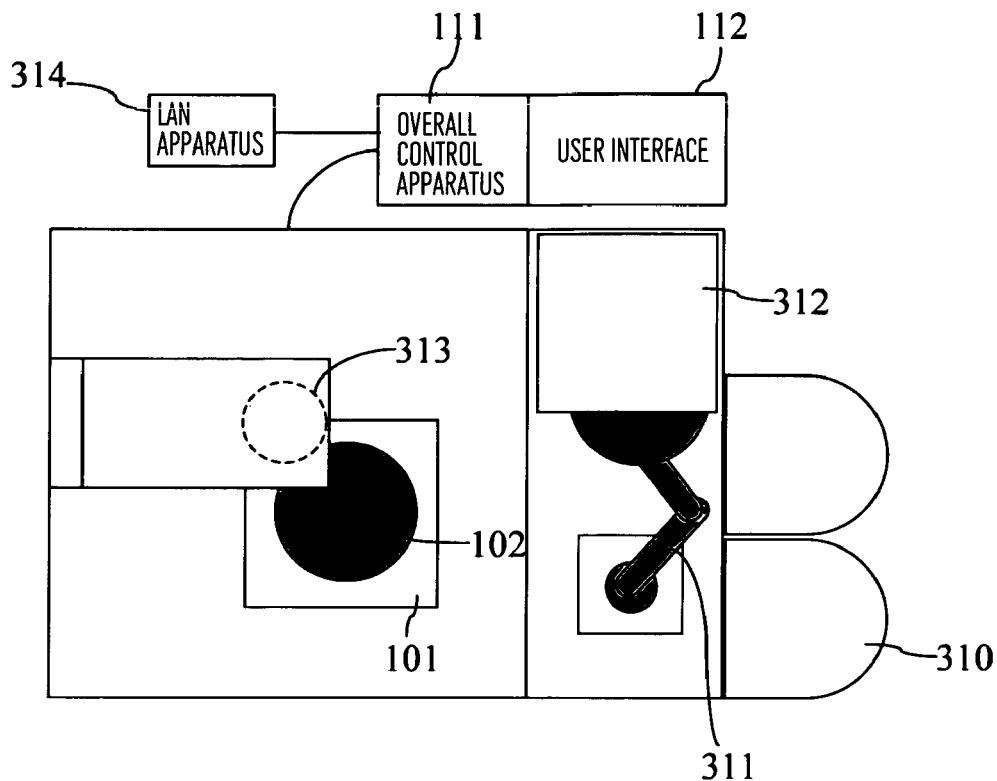
FIG. 20 is a view showing an embodiment of an apparatus construction when measurement of the semiconductor wafer is made according to the invention.

Next, the overall construction of the apparatus is shown by using FIG. 20. Reference numeral 313 denotes a detection head portion including the objective lens 105, the probe 103 and their driving systems and detection systems. Measurement is made by putting the sample 102 on the stage 101. Reference numeral 310 denotes a table on which a cassette having substrates mounted thereto is put. A robot arm 311 takes out the substrate from the table. After the rotating angle of the substrates is detected by a pre-aligner 312, the substrates are mounted onto the stage 101 in a predetermined direction and measurement is then conducted. The operation of the whole apparatus is controlled by an overall control apparatus 111, and acceptance of the instruction of an operator and display of an optical image and an SPM image can be made by a display/input apparatus 112. The overall control apparatus 111 is connected to a LAN apparatus and may exchange measurement data.

Figure 19:
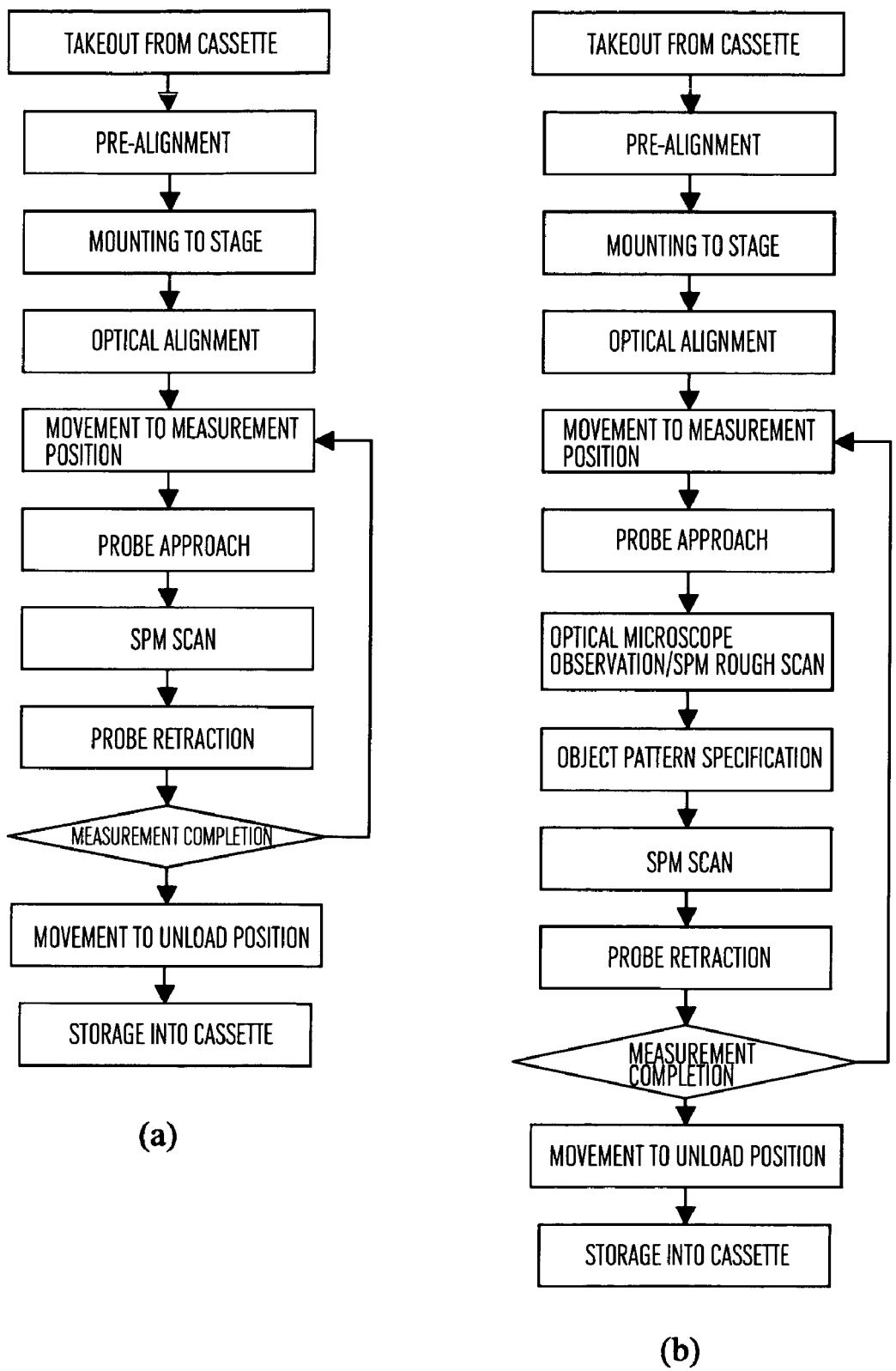
FIG. 19 is a flowchart showing an embodiment in which measurement of a semiconductor wafer is made according to the invention.

FIG. 19(a) shows a sequence of measurement. The robot arm 311 takes out the substrates from the cassette to which the substrates are mounted, and after the pre-aligner 312 detects pre-alignment of the substrates, that is, the rotating angle, it mounts the substrates in such a manner as to attain the predetermined direction. A plurality of positioning marks on the substrates is observed through the objective lens 105 and the position and the rotation of the substrates are precisely measured (aligned). The apparatus is moved to a registered measurement position on the basis of this information and measurement is started. First, the probe is lowered and brought into contact with the substrate. Next, scanning by the scanning probe microscope (SPM scan) is executed here and measurement data is obtained. The probe is retracted and the operation described above is repeated by returning to the next measurement point until measurement of all the designated measurement points is completed. After measurement of all the designated measurement points is completed, the stage is moved to an unload position and the robot arm 311 takes out the substrate and stores it into the cassette. Measurement of one substrate is finished in this way.

Alternatively, when positional information of the stage or alignment accuracy is insufficient owing to local existence of the measurement object patterns, the measurement object pattern does not fall in some cases within the SPM scan range. In such a case, the pattern is observed through an optical microscope as shown in FIG. 19(b) or a large scan range is roughly scanned by SPM. After the position of the registered measurement pattern is thus specified, precise SPM scan is conducted.

Because the invention makes it possible to conduct approach of the probe and SPM scan at a high speed, reduction of the time required for overall measurement can be accomplished.

Next, an embodiment for accomplishing high speed measurement by using the measuring method that repeats retraction/approach of the problem for each measurement point roughly explained in FIG. 4 and can conduct high precision measurement without imparting damage to the sample is given below.

Figure 12:
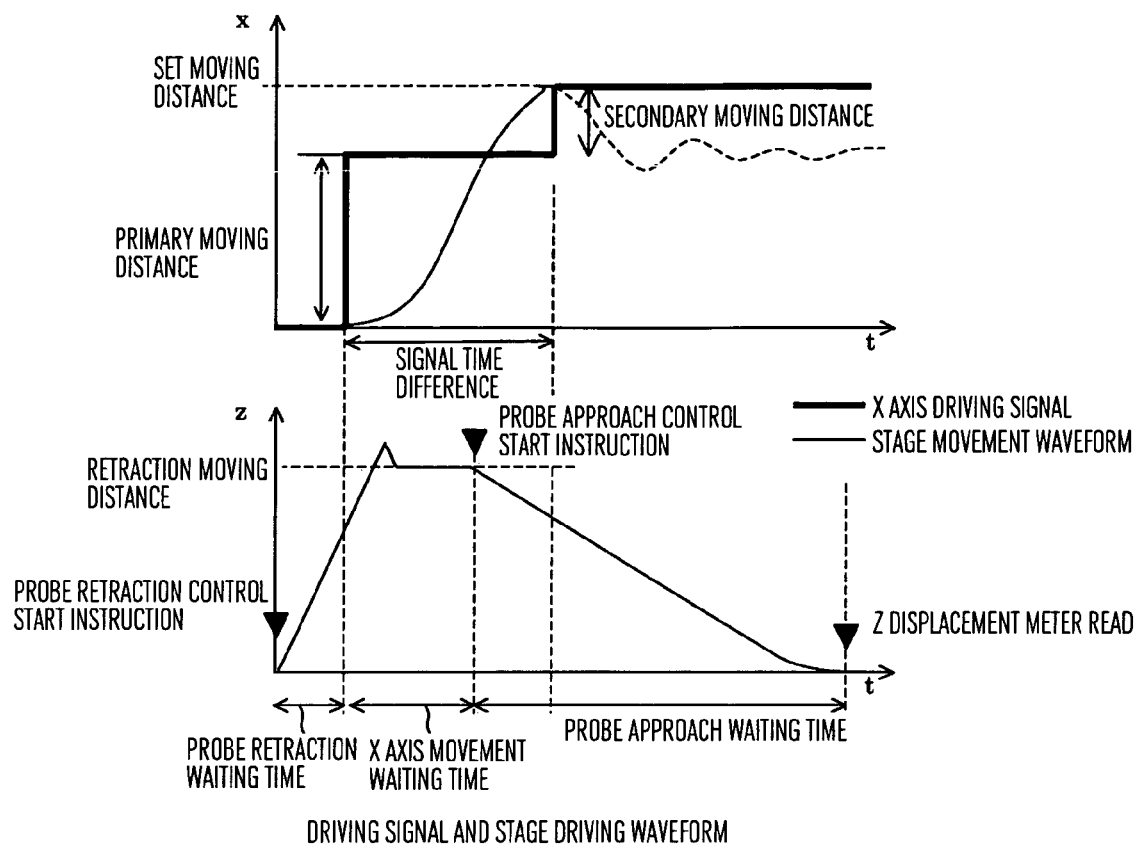
FIG. 12 is a view showing a control that accomplishes high-speed X axis driving.

FIG. 12 shows an embodiment of the method for accomplishing high speed driving by suppressing residual oscillation of the stage. The upper view is a view showing a time change of a relative position X between the sample and the probe in the transverse direction (position of sample stage or stage to which probe is fitted in transverse direction of stage) and the lower view is a view showing a time change of the height Z of the probe.

Figure 13:
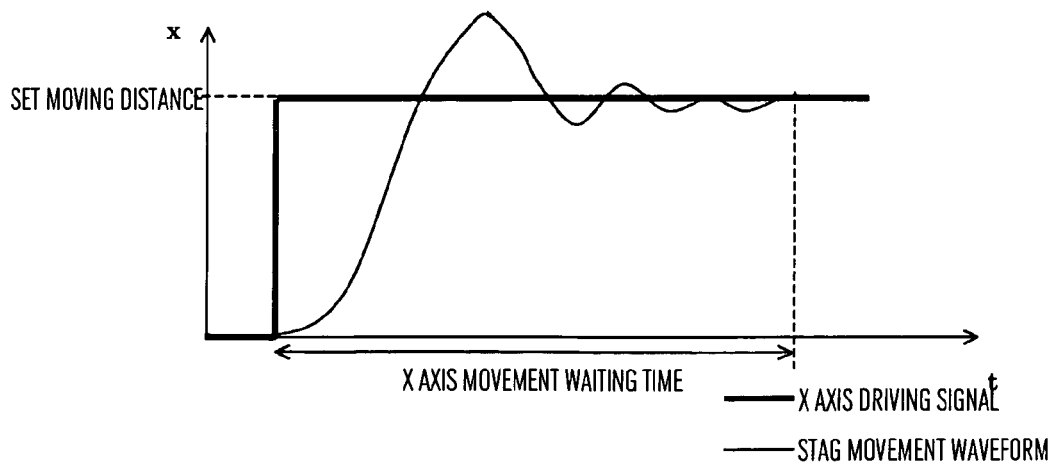
FIG. 13 shows X axis driving according to the prior art.

To accomplish the movement of the probe explained with reference to FIG. 4, it is necessary to first pull up the Z axis, then to move the X axis and to approach the Z axis. At this time, since driving of the X axis has a large inertial mass of the driving object with respect to the Z axis, residual oscillation remains as shown in FIG. 13 and positional accuracy of the probe gets deteriorated. Alternatively, re-approach of the Z axis is made after residual oscillation settles. These are one of the causes why the scan speed cannot be improved.

Therefore, the X axis is driven as shown in the upper view of FIG. 12. First, an X axis indication position is changed step-wise by a primary driving distance. Consequently, the X axis makes response as indicated by a curve. Unless the indication position is not as such changed at the primary driving distance, residual oscillation is generated as indicated by a curve of dotted line and settling must be awaited for a while. However, when a secondary driving distance equal to an overreach distance is given at a first maximum overreaching position, the speed of the X axis is zero just at this position. Therefore, settling can be made at this position because the present position is in agreement with the indication position. If the probe comes into contact with the sample after this point of time, accuracy of the X direction position of the probe at the contact time can be guaranteed, so that both high speed driving and accuracy can be satisfied.

The explanation will be made in further detail. First, the canning control portion 109 gives the retraction instruction of the probe to the probe driving portion 110 and after the passage of the probe retraction waiting time, the X axis is driven by the primary driving distance. This driving instruction may drive the probe in the transverse direction from the scan control portion 109 to the probe driving portion 110 or may drive the sample in the transverse direction after going to the sample stage 101. At this time, the primary driving distance is set to a value smaller than the set movement distance so that the maximum overreach distance of the X axis is in agreement with the set movement distance. The probe retraction waiting time is the time at which the probe substantially completely separates from the sample. Here, because the X axis does not quickly tarts moving, X axis primary driving may be made somewhat earlier than the complete separation of the probe from the sample.

After the X axis movement waiting time is awaited after X axis primary driving, the scan control portion 109 gives the probe approach control start instruction to the probe driving portion 110 and the probe starts the approaching operation. Because the probe retraction movement distance is excessively pulled out to overcome adhesion force between the distal end of the probe and the sample surface and because the time exists before the distal end of the probe again comes into contact with the sample surface, the probe approach control start instruction can be given more quickly than the X axis movement completion by this time lag. After a predetermined time passes after the probe approach control start instruction, a Z axis displacement meter is read and the height of the sample at this point is determined.

By the way, this probe approach waiting time is the waiting time before the probe comes into contact with the sample and enters the state where it keeps contact with the sample at a predetermined contact pressure. As for this probe approach waiting time, it is of course possible to measure a predetermined time by a timer or to judge the finish of approach waiting by monitoring the state where the change of the probe deflection signal or the Z axis driving signal or the change of the Z displacement signal stops and becomes constant.

Next, a higher speed driving method will be explained by using FIG. 14. As described above, to release adhesion of the probe, the Z axis must be pulled up excessively by at least the adhesion release height. Since the Z axis is excessively pulled up at the time of probe approach, the probe does not come into contact, in principle, even when the probe is allowed to approach. Therefore, quick approach is made and a higher speed can be achieved.

Figure 14:
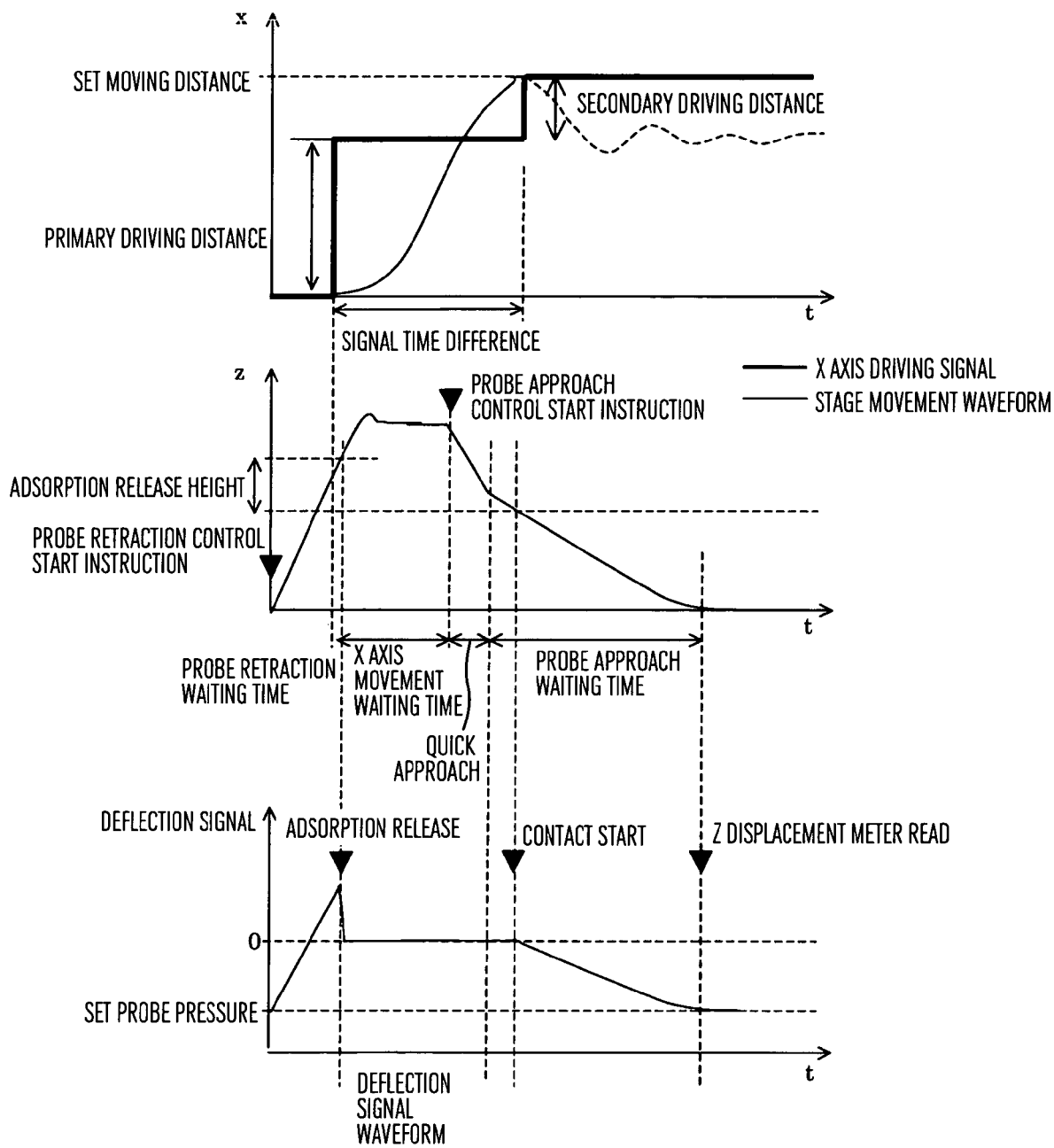
FIG. 14 is a view showing high-speed X axis driving and a timing of approach/retraction of the probe.

The deflection signal at this time is shown in FIG. 14. The adhesion release timing is known by further analyzing the deflection signal and the timing of the shift to the next operation can be known. In other words, the sign of the deflection signal reverses at the time of adhesion by the tensile force and quickly returns to 0 at the time of release. Therefore, a whisker-like pattern appears as in the lower view of FIG. 14 and this signal pattern is detected.

After the pattern of the deflection signal at the time of adhesion release is detected, the approach of the probe may be immediately started provided that the step of the sample is known as being small in advance. When any step exists to a certain extent, the probe is further retracted by the balance obtained by subtracting the adhesion release height that becomes necessary at the time of adhesion release from the maximum step and the approach of the step is then started.

Figure 22:
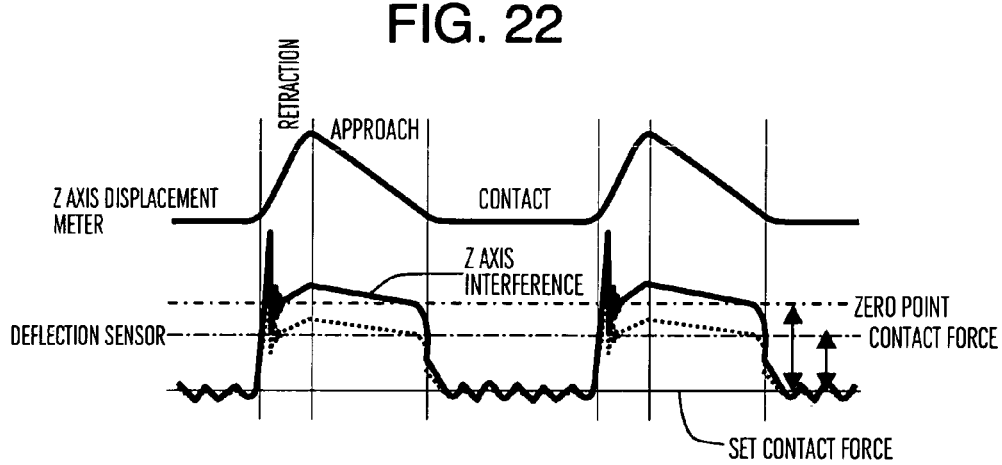
FIG. 22 is a view showing problems when measurement is made at low contact force.
Figure 23:
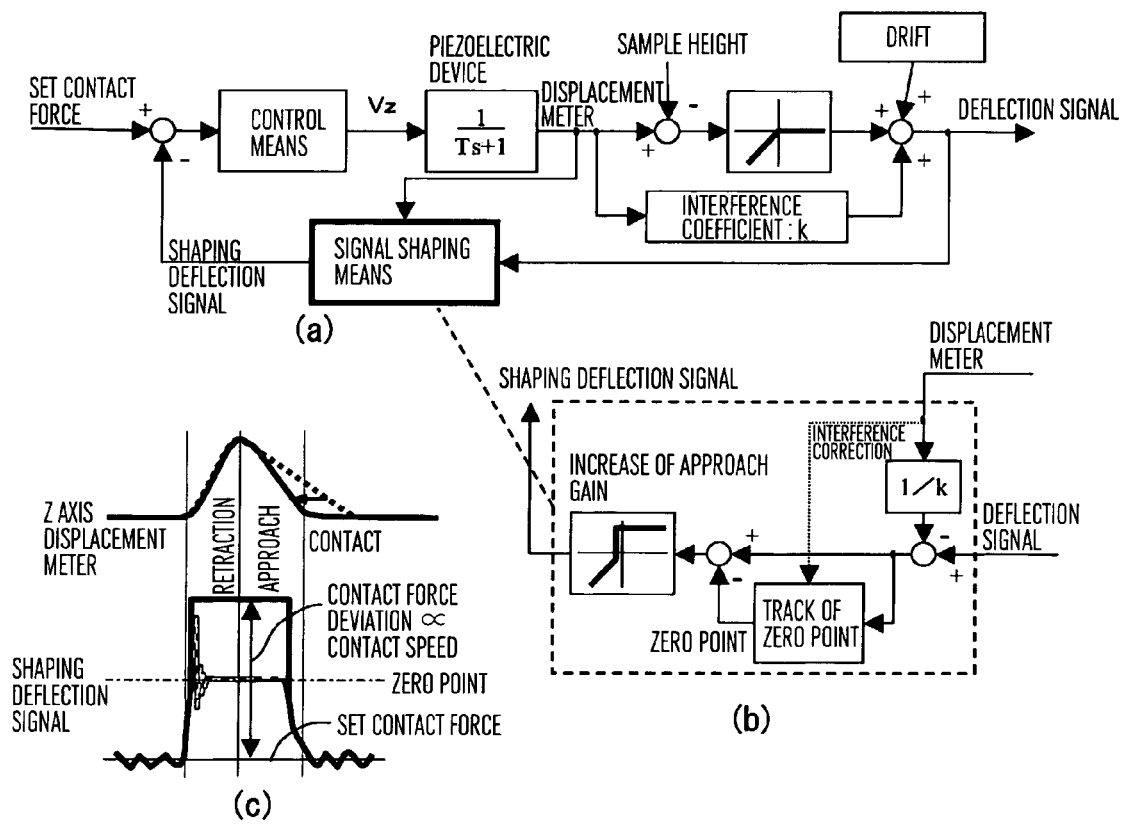
FIG. 23 is a view showing an embodiment of a method that conducts measurement stably and at a high speed and low contact force by shaping a deflection signal.

Next, a method of probe high speed approach driving and stability control at a low contact force is shown by using FIGS. 22 and 23. FIG. 22 shows the signals of the Z axis displacement meter and the deflection sensor during the scan operation shown in FIG. 4 at only two measurement points. In this way, the Z axis displacement rises at the time of retraction and at the same time, the deflection once exhibits the whisker-like change due to adhesion and then the probe enters the free condition. When the probe again comes into contact with the sample after the passage of a certain time from the start of the approach, the signal of the deflection sensor again exhibits repulsion. Further, when the push amount of the probe reaches the set contact force, control is made by servo so that the value of the deflection sensor can be kept constant. At this time, the following problems exist.

The first is the problem of interference. The upper and lower parts of the problem interfere with the deflection signal and invite fluctuation in the deflection signal. Generally, deflection signal is expressed as deflection signal=probe deflection amount+k×Z axis displacement meter signal+constant term. K is an interference coefficient. Due to the interference, set accuracy of the contact force gets deteriorated. In a construction having the Z axis on the probe side, in particular, this influence is great. Set accuracy of the contact force gets deteriorated, too, as the zero point of the deflection sensor signal gently changes depending on the change with time.

To conduct high precision measurement without causing deformation of the sample, it is desired to keep the contact force as small as possible. It is generally difficult in many cases to keep the contact force at several nN or below due to the problem described above. There is the problem that the approach speed is not increased because a deviation signal of servo at the time probe approach is not sufficiently great under the condition where the set contact force is small. For, the change speed of the piezoelectric device application signal is small under the condition where the deviation signal, that is, the change speed of the probe position, is small, because the signal proportional to the time integration value of the deviation signal is applied to the piezoelectric device in control of ordinary piezoelectric devices.

FIG. 23 shows an embodiment to cope with these problems. FIG. 23(a) is a control block diagram at the time of probe approach control. The difference between the set contact force and the shaping deflection signal is inputted to control means. In the control means, a voltage signal Vz passed through an integrator, or the like, is applied to the piezoelectric device. Incidentally, as another embodiment, the signal passed through a proportional controller may be amplified by a current amplifier and may then be applied to the piezoelectric device. When a voice coil motor, a magnetorestrictive device, etc, is used in place of the piezoelectric device, too, the signal passed through the proportional controller may be amplified by the current amplifier and may then be applied to the Z axis driving means. It is to be noted hereby that this embodiment can be established whichever means is employed as the Z axis driving means of the prove movement mechanism 116.

The deflection signal occurs when the resulting Z axis displacement of the probe is lower than the height of the sample. The deflection signal is 0 in other cases. In practice, the product of the Z axis displacement by the interference coefficient k adds as the interference term. Drift is also added. Finally, their sum signal is detected as the deflection signal.

Generally, the difference between the deflection signal and the set contact force is applied to the control means. In this embodiment, the signal shaping means is added, the shaping deflection signal is generated and its difference from the set contact force is delivered to the control means so as to cope with the problems of the interference of the deflection signal and the change with time described above in the signal shaping means and the problem that the probe approaching speed is low. An operation block diagram in the signal shaping means is shown in FIG. 23(b). In this way, interference correction is achieved when the displacement meter signal is inputted in addition to the deflection signal and the displacement meter signal is multiplied by the interference correction coefficient 1/k and is then subtracted from the deflection signal. The deflection signal the interference of which is corrected is inputted to zero point track means.

The zero point track means detects the condition in which the probe is free and the deflection signal has a constant value, and calculates the mean value of the signal during this period. Because this value is the zero point, a deflection signal that is always kept at 0 under the free condition of the probe can be achieved by subtracting the value from the interference-corrected deflection signal. In this way, the sample can be stably scanned with low contact force without being affected by the change of the deflection signal with time and its interference.

Furthermore, as shown in FIG. 23(c), the control gain of the probe height is increased and high speed approach is made under the free condition where the probe is out of contact from the sample to improve the approaching speed. This can be accomplished by detecting the free condition of the probe by using the signal shaping means, transmitting the free condition to the control means and increasing the gain for only the probe free condition period.

The method shown as another embodiment in FIGS. 23(b) and (c) is a method that shapes the deflection signal itself and inputs the signal to the control means. In other words, this is the method that shapes the deflection signal so as to acquire large attraction (deflection signal of opposite sign to repulsion) under the probe free condition. Detection of the probe free condition can be accomplished by simply setting a threshold value of a minus constant value to the zero point and replacing the deflection signal by a certain large value representing attraction when the value exceeds the threshold value. Incidentally, in this specification, the explanation is given about the case where plus of the deflection signal is attraction and minus is repulsion. It is of course obvious that the explanation can be similarly applied by appropriately replacing the large-and-small relation in the explanation when the assumption of the sign is opposite.

Figure 15:
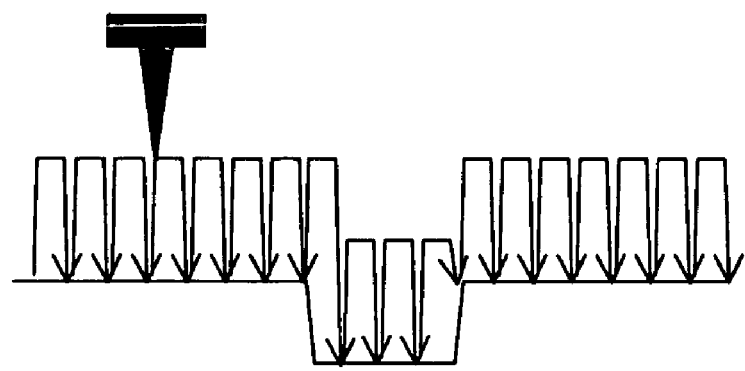
FIG. 15 is a view showing a method for conducting optimization control of a retraction distance.
Figure 15:
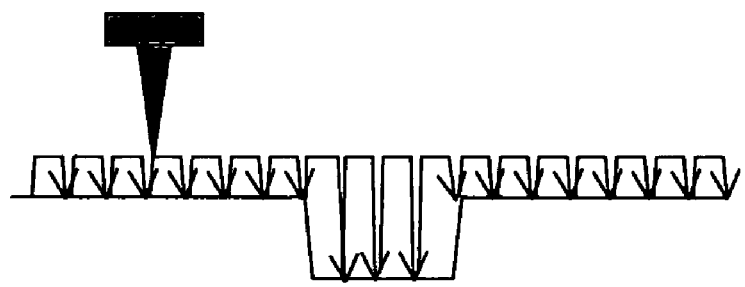
Figure 15:
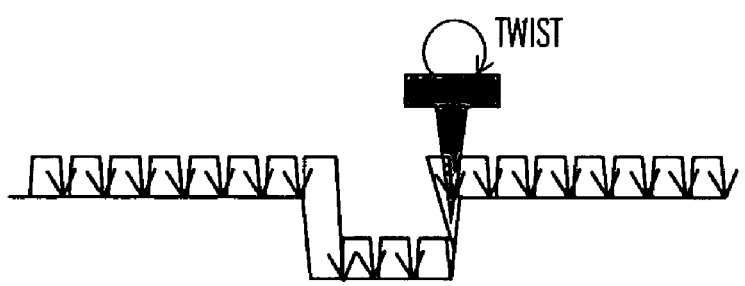
Figure 15:

Next, an embodiment for accomplishing higher speed measurement by making the retraction distance of the probe variable is shown by using FIG. 15. To correctly measure the step, it has been necessary in the past to secure a retraction distance greater than the maximum step of the sample to measure the step and then to approach towards the next measurement point. In contrast, when the step structure of the object is known in advance to a certain extent such as memory pits of a semiconductor optical disk, it is possible to reduce the probe distance by utilizing the pits as shown in FIG. 15(b). The retraction distance is kept at the minimum necessary distance for releasing adhesion of the probe and the sample while the probe scans a high surface of the sample and is provided with a small margin with respect to the step of the sample while the probe scans a low surface. In this way, the overall scan time can be reduced.

As still another embodiment, a method is proposed that always keeps the retraction distance of the probe at the minimum necessary distance for releasing adhesion and temporarily increases the retraction distance when the step portion is detected as shown in FIG. 15(c). A method that uses a twist signal is shown as an embodiment of the detection method of the step portion as shown in the drawing. The construction for simultaneously detecting the twist of the probe and the twist signal has been described already. When a right twist signal is detected at the step portion by utilizing this method, the probe is judged as scanning the position at which it runs on the step and re-approach is made by increasing the retraction distance. It is conceivable to use a method that increases the retraction distance for the measurement of the next point without making re-measurement and skips the measurement of the same point, though accuracy somewhat drops. Another method that judges the approach to the step portion when the measurement height changes to a higher direction than a certain change ratio and increases the retraction distance may be used, too.

Figure 16:
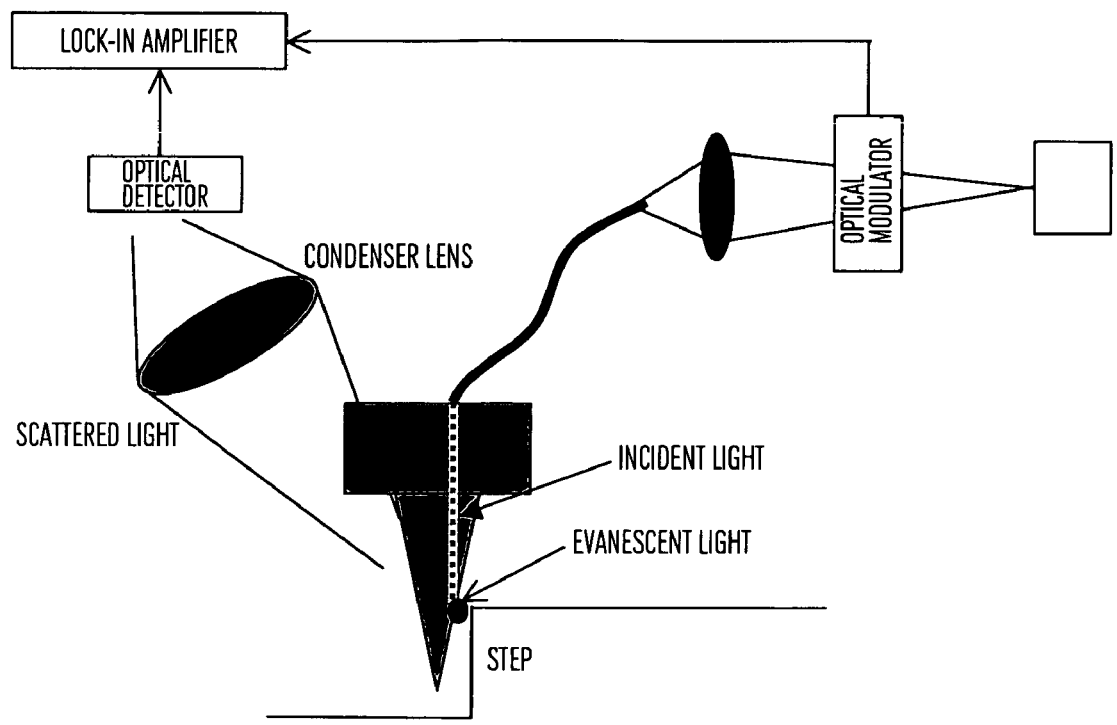
FIG. 16 is a view showing a method for detecting approach to a step by using near-field light.
Figure 16:
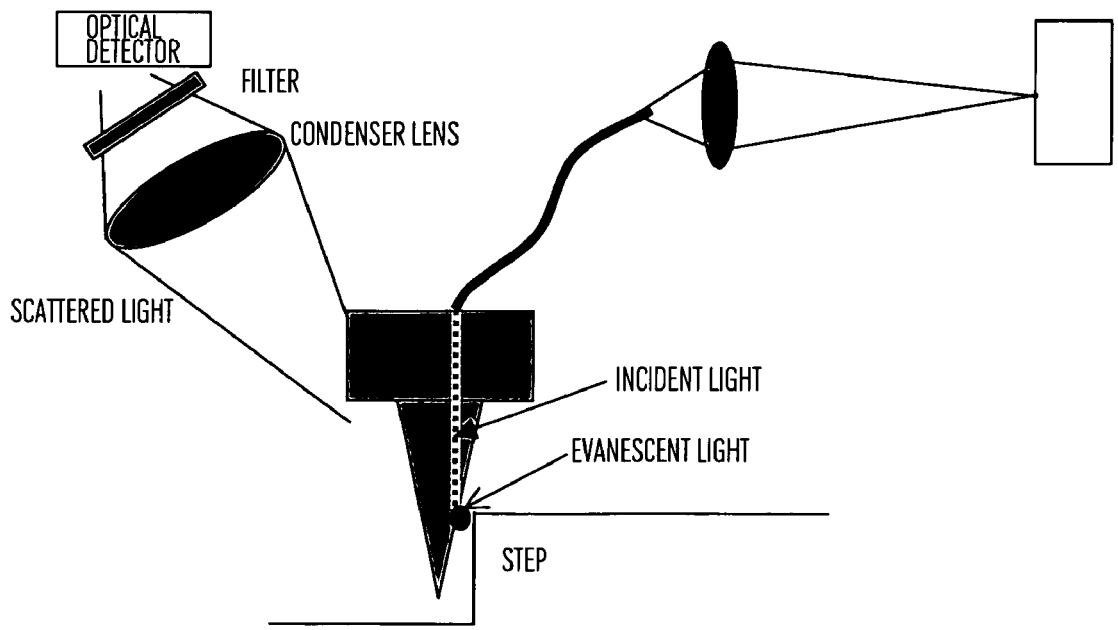
Figure 17:
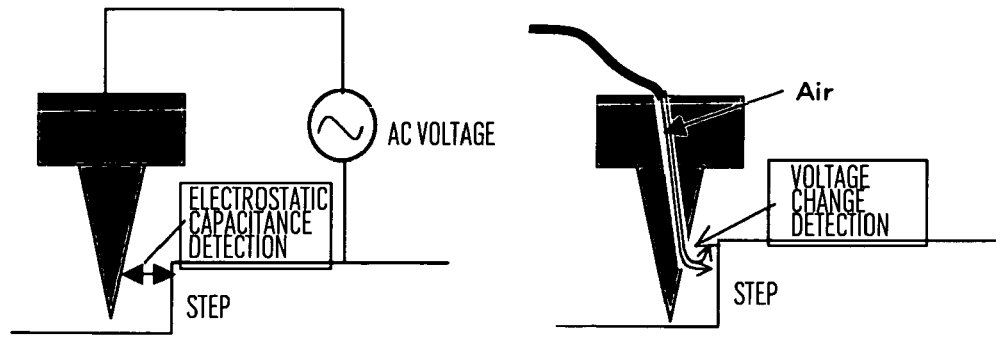
FIG. 17 is a view showing another method for detecting the approach to the step.
Figure 17:
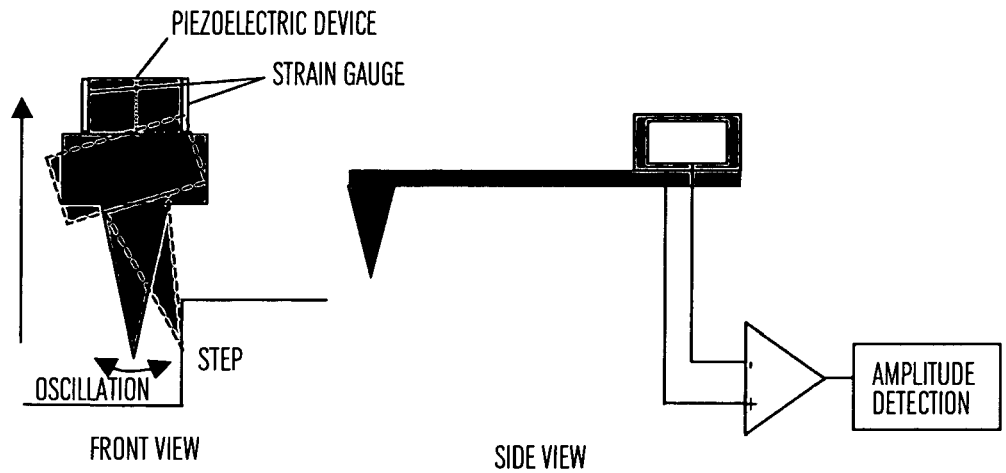
Figure 17:
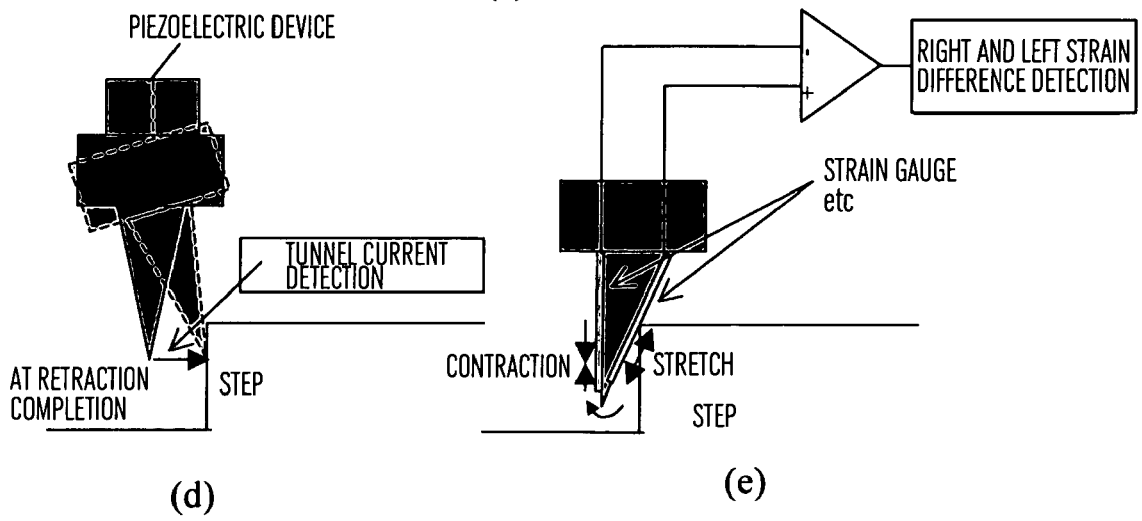

Still another method of step detection is shown by using FIGS. 16 and 17.

FIG. 16 shows a method using near-field light. Light is guided to a fine point on a side surface of the probe through an optical fiber, or the like. When the probe approaches the step portion, near-field light (evanescent light) is scattered and the quantity of light detected through a condenser lens changes. In FIG. 16(a), light detected by applying modulation to a light source is synchronously detected by a lock-in amplifier for a modulation frequency and a minute change of the quality of light is detected. In FIG. 16(b), illumination is made by a monochromatic light source and only a wavelength of illumination light is allowed to pass to detect the minute change of the quantity of light. The method using near-field light has the advantage that the approach to the step can be detected before the actual contact with the step. Incidentally, various constructions are known for illumination/detection of near-field light source. Therefore, near-field light on the surface of the probe can be detected by using any of them and embodiments using them can be easily conceived.

FIG. 17(a) shows a method that detects the change of electrostatic capacitance resulting from the approach of the probe to the sample by the change of a current of an AC voltage applied in advance across the probe and the sample. FIG. 17(b) shows a method that detects the change of a gas pressure resulting from the approach of the probe to the sample by causing a gas to flow through a fine aperture. FIG. 17(c) shows a method that transversely oscillates the probe during retraction of the probe and detects the change of amplitude or phase resulting from the approach of the probe to the step by using a strain gauge or electromotive force of a piezoelectric device itself. FIG. 17(d) shows a method that detects tunnel current resulting from the approach of the probe to the step. FIG. 17(e) shows a method that detects strain resulting from the approach of the probe to the step by a strain gauge formed on the side surface of the probe.

Figure 18:
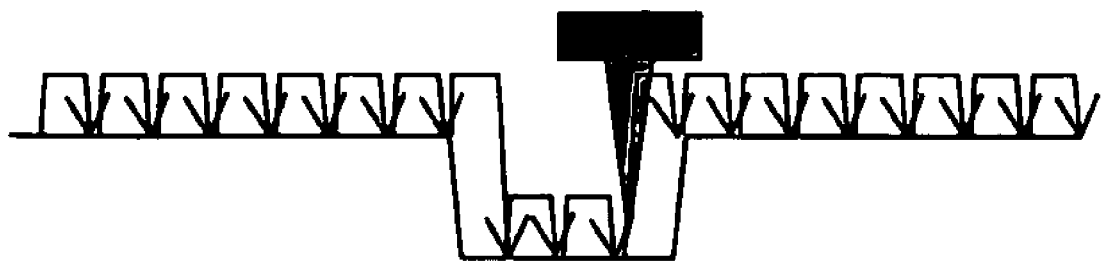
FIG. 18 is a view showing a probe trajectory when the retraction distance of the probe is controlled by detecting the approach to the step.

FIG. 18 is a schematic view of the movement of the probe when the approach of the step is detected before contact with the step as explained above. Unlike FIG. 15(c), higher speed measurement becomes possible in this way without conducting again the probe retraction operation and its approach operation at the step portion.

Incidentally, the explanation has been made in this embodiment on the assumption that the probe is driven. However, what is important here is relative driving of the probe to the sample and the invention is not premised on the assumption that the probe side has the X, Y and Z axes. Needless to say, the discussion in this embodiment can be established in the construction that has X and Y axes on the sample side and the construction that has the X, Y and Z axes on the sample side.

Figure 25:
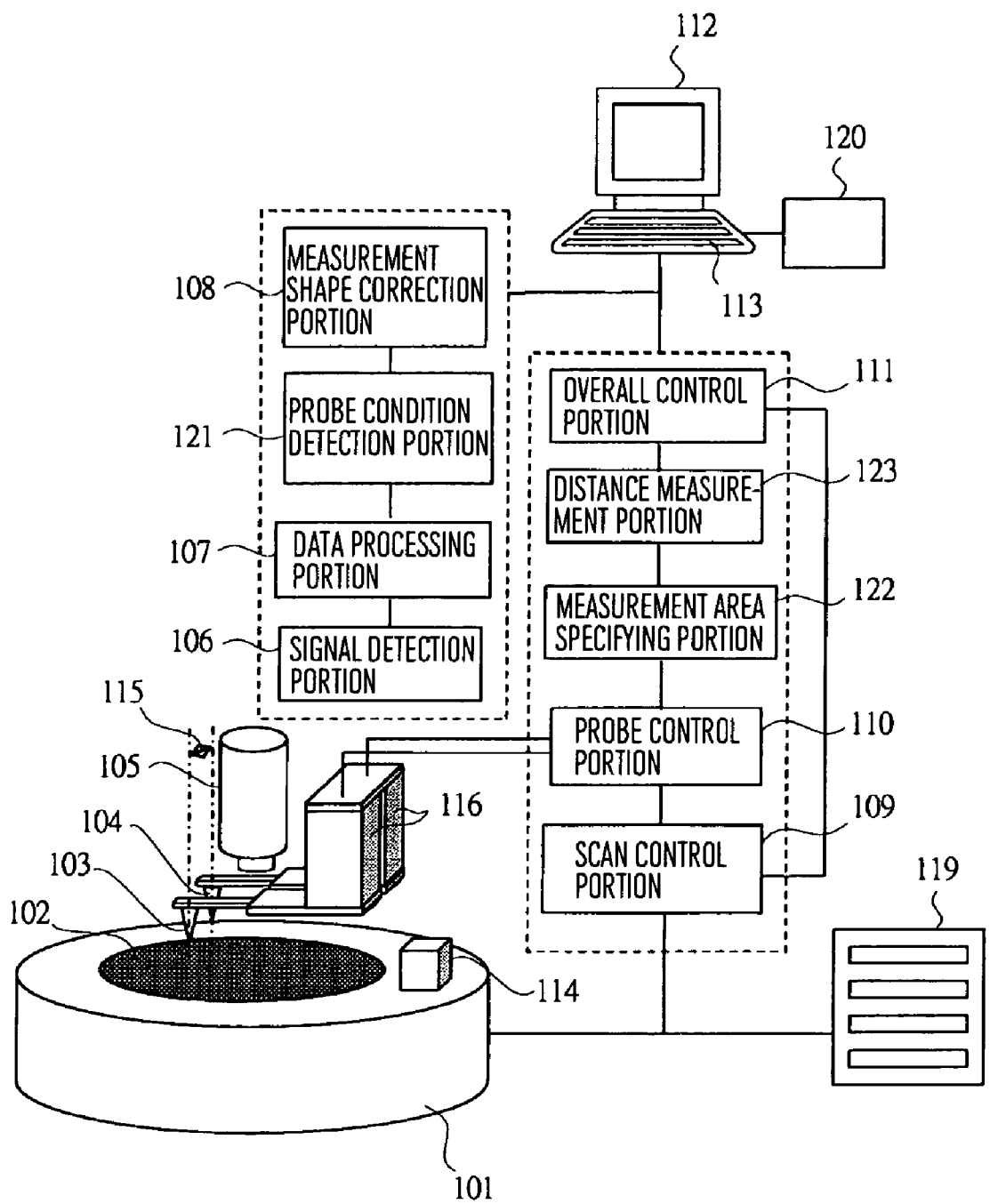
FIG. 25 is a structural view showing an example of an atomic force microscope (AFM) as one of the scanning probe microscopes in an embodiment of the invention.
Figure 26:
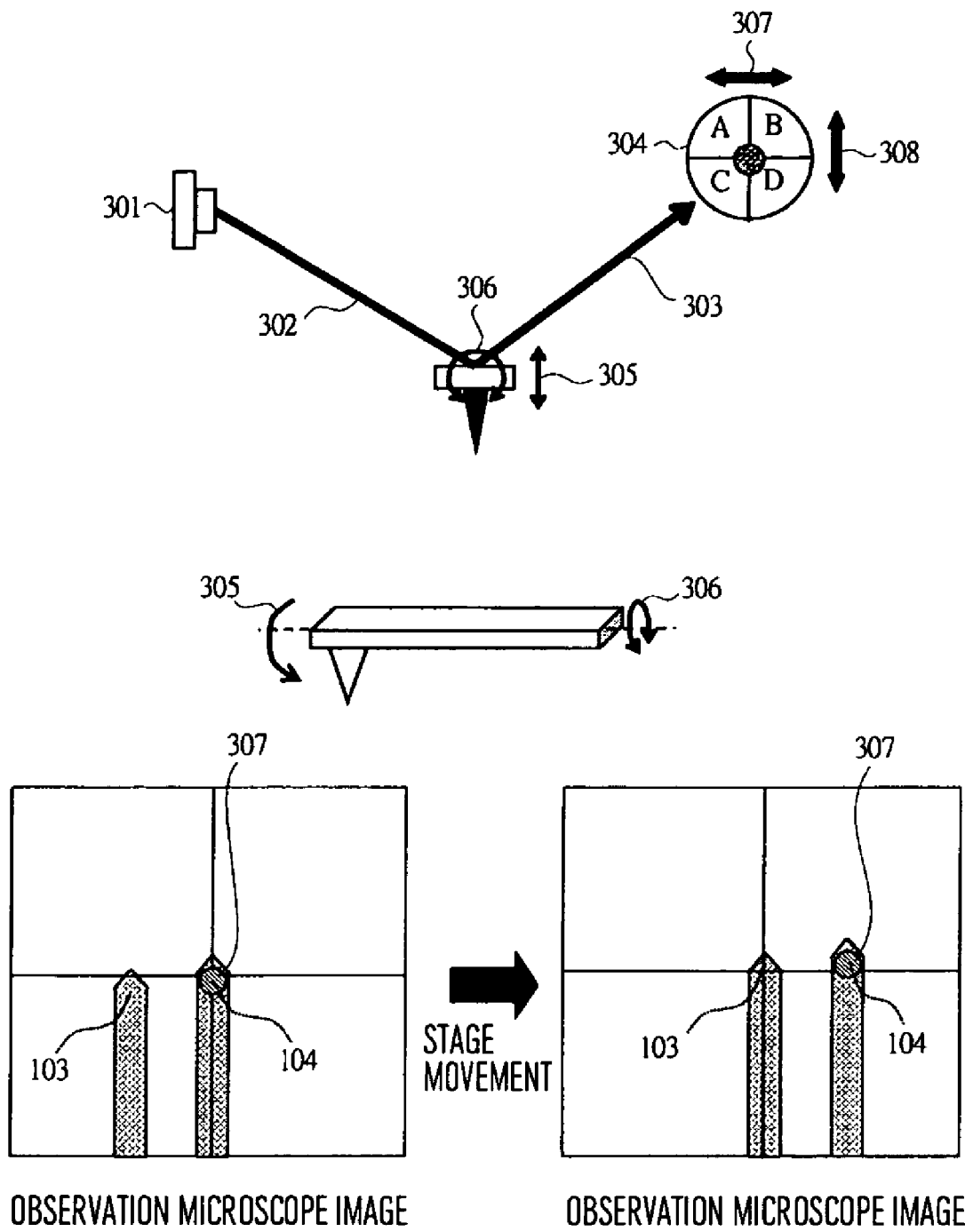
FIG. 26 is an explanatory view showing an optical lever optical system in an embodiment of the invention and a positioning method of the optical system.

FIG. 25 is a structural view showing an example of an atomic force microscope (AFM) as one of the scanning probe microscopes according to an embodiment and FIG. 26 is an explanatory view showing a positioning method of an optical cantilever optical system and an optical system.

In FIG. 25, the atomic force microscope (AFM) is constituted by a sample stage (rough movement stage) 101, a sample 102, a CD/sectional profile measurement probe 103, a measurement area specifying probe 104, a sample observation portion 105, a signal detection portion 106, a data processing portion 107, a measurement shape correction portion 108, a scan control portion 109, a probe control portion 110, an overall control portion 111, an image display portion 112, an input device 113, a probe shape monitor standard sample 114, a piezoelectric device 116, a load port 119, an external output device 120 such as a floppy (R) disk, MO, etc, a probe condition detection portion 121, a measurement area specifying portion 122 and a distance measurement portion 123.

The signal detection portion 106, the data processing portion 107, the measurement shape correction portion 108 and the probe condition detection portion 121 execute processing related with data and signals, and the scan control portion 109, the probe control portion 110, the overall control portion 111, the measurement area specifying portion 122 and the distance measurement portion 123 execute control related with the probe.

The sample 102 is put on the rough movement stage 101 that can be driven in X, Y and Z and is controlled by the scan control portion 109. The cantilever to which the CD/sectional profile measurement probe 103 is fitted is arranged at a position exactly opposing the sample 102. In this embodiment, a deep probe having a pyramidal shape and high wear resistance is used as the measurement area specifying probe besides the reduction of the wear of the probe due to measurement for acquiring the measurement area specifying image. A probe the tip of which is sharply pointed and which is excellent in the measurement of a high aspect ratio shape is used for the CD/sectional profile measurement. Therefore, to reduce the trouble of reducing their exchange, the measurement area specifying probe 104 is separately prepared.

In the measurement area specifying portion 122, the image of the surface of the sample 102 is acquired by using the measurement area specifying probe 104 and the measurement area of the sample 102 is specified on the basis of this image.

The operation of each probe 103 and 104 is controlled by the probe control portion 110 and the distance measurement portion 123 measures the distance between these probes.

The sample observation portion 105 such as an optical microscope for executing rough position adjustment of each probe 103 and 104 and the sample 102 and the signal detection portion 106 including an optical lever optical system constituted by a laser light source and a photo detector (4-split photo detector) or an optical interference optical system are arranged above the cantilever and detect the deflection amount 305 of the cantilever shown in FIG. 26 or its twist amount 306.

The signal detected by the signal detection portion 106 is processed by the data processing portion 107 and the probe condition detection portion 121 detects the condition of the probe on the basis of the data of the data processing portion 107. The measurement shape correction portion 108 corrects the measurement shape on the basis of the condition of the probe.

Here, the detection principle of the deflection amount of the cantilever and its twist amount by the optical lever optical system is explained by using FIG. 26.

Light outgoing from the laser light source 301 is reflected by the rear surface of the cantilever and reflected light is detected by the 4-split photo detector 304. When deflection denoted by reference numeral 305 in FIG. 26 occurs at this time in the cantilever, the spot of light moves in a 307 direction of the 4-split photo detector 304. When twist denoted by reference numeral 306 in FIG. 26 occurs at this time in the cantilever, the spot of light moves in a 308 direction of the 4-split photo detector 304.

Therefore, when a signal difference of (A+C) and (B+D) of the 4-split photo detector 304 is calculated, the result is a signal proportional to the deflection amount of the cantilever. When a signal difference of (A+B) and (C+D) is calculated, the result is a signal proportional to the twist amount of the cantilever. Accordingly, detection of both deflection and twist signals becomes possible.

In the case of this embodiment, two probes and two cantilevers are prepared as described above. Therefore, the deflection amount or the twist amount must be detected for each cantilever.

Here, this method is explained by using FIG. 26.

Measurement is conducted in the order of the measurement area specifying image measurement and the CD/sectional profile measurement. Therefore, positioning of the laser light source and the photo detector is first made for the measurement area specifying probe 104. In this instance, the probe estimation position of the measurement area specifying probe 104 is aligned with the center of the observation microscope and after positioning is completed, the rough movement stage 101 is moved so that the probe estimation position of the CD/sectional profile measurement probe 103 can be aligned with the center.

At this time, since the moving distance (X direction, Y direction) of the rough movement stage 101 is the distance between the two probe estimation positions, positioning to the CD/sectional profile measurement probe 103 can be made automatically and easily by moving the positions of the laser light source 301 and the position of the photo detector 304 by the distance calculated.

The deflection or twist signal detected is converted to the image by the data processing portion 107, is corrected (deconvolution) by the measurement shape correction portion 108 on the basis of the probe shape monitor result in the standard sample 114 and is displayed by the image display portion 112 such as a display.

Next, the procedure for conducting the CD/sectional profile measurement by this embodiment is explained.

Figure 27:
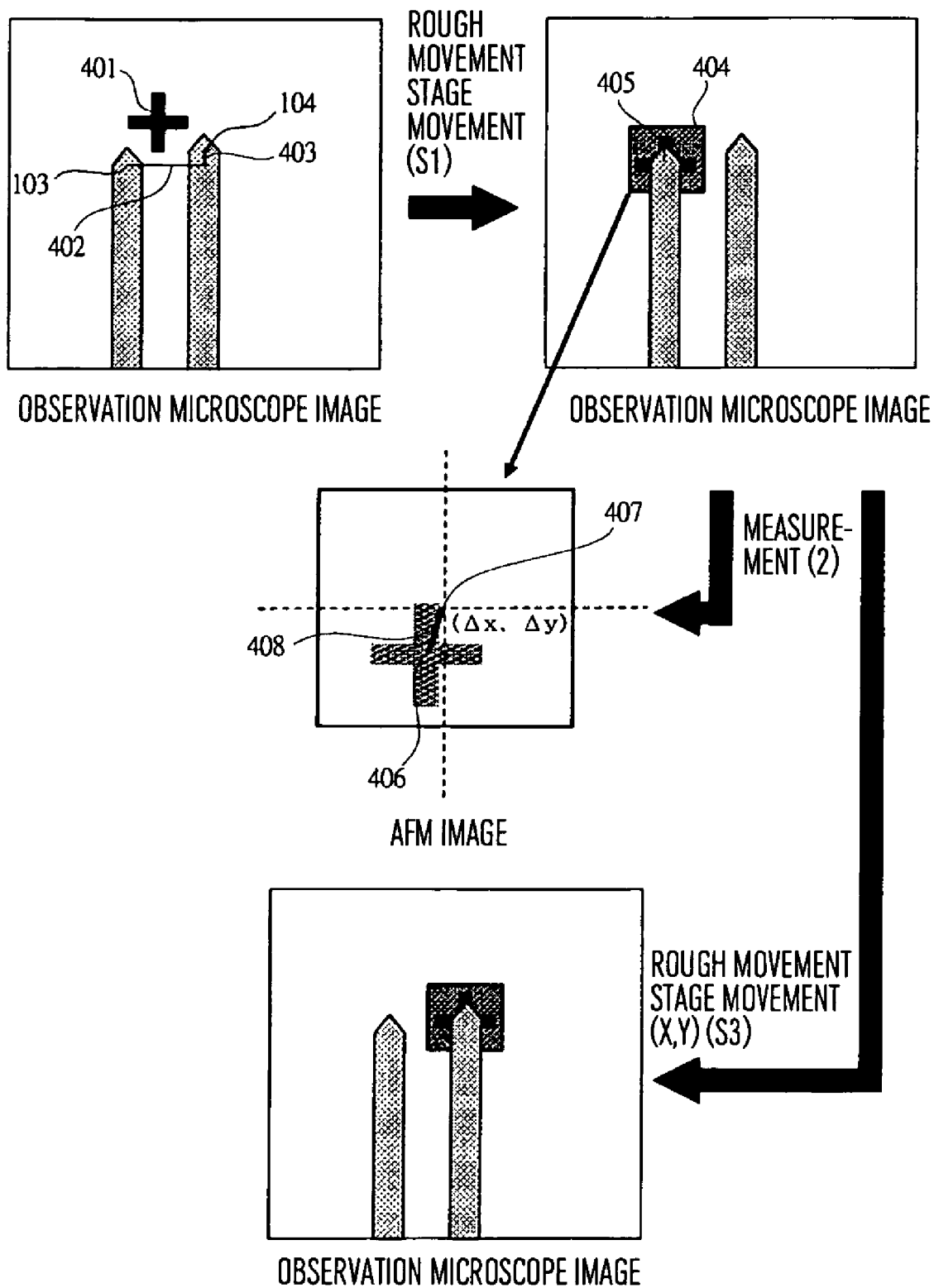
FIG. 27 is an explanatory view showing a distance measurement (calibration) method between two probes in an embodiment of the invention.

First, when the two probes are used for the measurement, it is necessary to measure (calibration) the positional relation (X axis direction distance 402, Y axis direction distance 403) of the two probe tips at the initial positions shown in FIG. 27.

This method is hereinafter explained by using FIG. 27.

FIG. 27 is an explanatory view showing the distance measurement (calibration) method between the two probes.

First, a sample on which a crisscross pattern is depicted such as the one shown in FIG. 27 is prepared and the rough movement stage (sample position) 101 is moved so that one of the cantilever estimation positions 405 and the center 406 of the crisscross pattern are aligned on a line in the Z axis direction (processing S1).

Next, the measurement area 404 is set in such a fashion as to include the crisscross pattern with the probe position under this condition as the center, and measurement of the crisscross pattern is conducted (processing S2).

In this instance, the center 406 of the measured crisscross pattern exists at the position of the center 407 of the measurement image when the center 405 of the probe and the center 406 of the crisscross pattern are in agreement owing to the first arrangement but deviation ($\Delta x$, $\Delta y$) indicated by 408 in FIG. 27 takes place at the center of the measurement image and the center position of the crisscross pattern when the center of the crisscross pattern and the center of the probe do not coincide.

Therefore, the deviation amount 408 is measured and the rough movement state (sample position) 101 is moved for the other cantilever probe so that the estimation position and the center of the crisscross pattern are in agreement. Measurement is thereafter made in the same way as the processing 1 to 3 described above. For example, the rough movement stage (sample position) 101 is moved by the deviation amount of the center of the measurement image and the center position of the crisscross pattern and is used as the final moving distance (X, Y) of the rough stage (sample position) 101.

When the operation described above is conducted after the exchange of the probe, it becomes possible to measure the deviation amount ($\Delta x$, $\Delta y$) of the crisscross pattern from the image center in the first measurement image and the distance between the probes in the X and Y directions of the respective cantilevers from the final moving distance (X, Y) of the sample.

This measurement of the distance between the probes may be conducted in the following way. After the deviation amount ($\Delta x$, $\Delta y$) of the crisscross pattern from the image center in one of the measurement images is measured, the rough movement stage (sample position) 101 is moved for the other cantilever probe so that its estimation position and the center of the crisscross pattern are coincident, and this position is used as the moving distance (X, Y) of the rough movement stage (sample position) 101. Under this condition, measurement is conducted in the same way as the processing 1 to 3 described above. The deviation amount ($\Delta x'$, $\Delta y'$) of the crisscross pattern in the measurement image from the image center of the crisscross pattern is measured and the distance between the probes is measured in both X and Y directions of the respective cantilevers from the deviation amount ($\Delta x$, $\Delta y$), the deviation amount ($\Delta x'$, $\Delta y'$) and the moving distance of the rough movement stage (sample position) 101.

Next, a measurement method of the measurement area specifying image is explained.

After rough position adjustment of the sample is first made so that the visual field of the sample observation portion 105 of the optical microscope, etc, enters the measurement area, the measurement area of the measurement area specifying image measurement is set to a range broader than a CD/sectional profile measurement schedule area by the measurement area specifying probe 104, and measurement is conducted.

The measurement in this case is directed to specify the minute pattern position as described above. Therefore, the image need not have high resolution and the scan speed is raised to the maximum extent that permits pattern recognition, and the measurement time is reduced.

The reason why this embodiment prepares two probes is because wear of the probes by the observation image measurement is taken into consideration as described above. However, no problem occurs by using one probe if a material excellent in wear resistance such as a carbon nano-tube is used.

Besides the atomic force microscope (AFM) image described so far, the near-field image (NSOM: Near-Field Scanning Optical Microscope) image is conceivable as the SPM image of the observation position specifying image. In this case, an aperture is formed at the distal end of the CD/sectional profile measurement cantilever and near-field light is irradiated from this aperture to the sample. In this way, one probe can be used as the probe for both AFM and NSOM.

It is further possible to use a microscope image of a specific near-UV zone or a far-(deep) UV zone to specify the observation position when the fine pattern is about 150 nm or above.

The construction when the microscope image of the near-UV zone or far-(deep) UV zone is used as the observation position specifying image is hereby explained.

Figure 28:
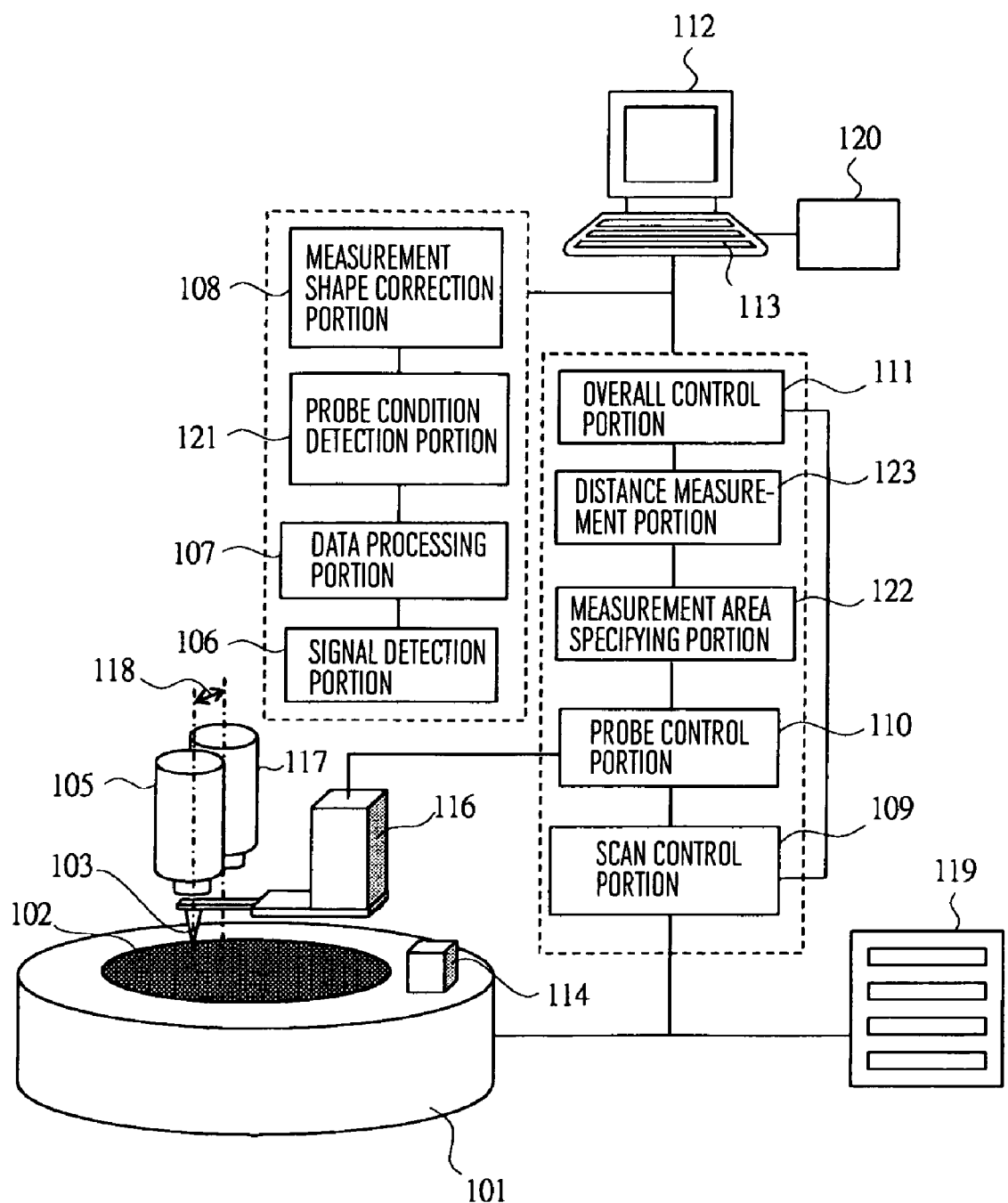
FIG. 28 is a structural view showing an example of a construction when a microscope image of a near- or far-UV range is used as an observation point specifying image in this embodiment.

FIG. 28 is a structural view showing an example of the construction when the microscope image of the near-UV zone or far-(deep) UV zone is used as the observation position specifying image in this embodiment.

The construction in FIG. 28 is the same as the construction shown in FIG. 25 with the exception that the measurement area specifying microscope 117 is disposed in place of the measurement area specifying probe 104 in FIG. 25.

In the example shown in FIG. 2/, the measurement area specifying microscope 117 and the cantilever preferably use coaxial arrangement but when an objective lens having a high magnification ratio, the distance (operation distance) between the objective lens and the sample cannot be secured.

Therefore, the cantilever does not enter below the measurement area specifying microscope 117 and the case where the coaxial arrangement is difficult may exist.

In this case, the cantilever and the measurement area specifying microscope 117 must be arranged on separate axes as shown in FIG. 28 and the positional relation between the probe 103 of the cantilever and the measurement area specifying microscope 117 must be measured (calibration).

This method will be explained in the following by using FIG. 29.

Figure 29:
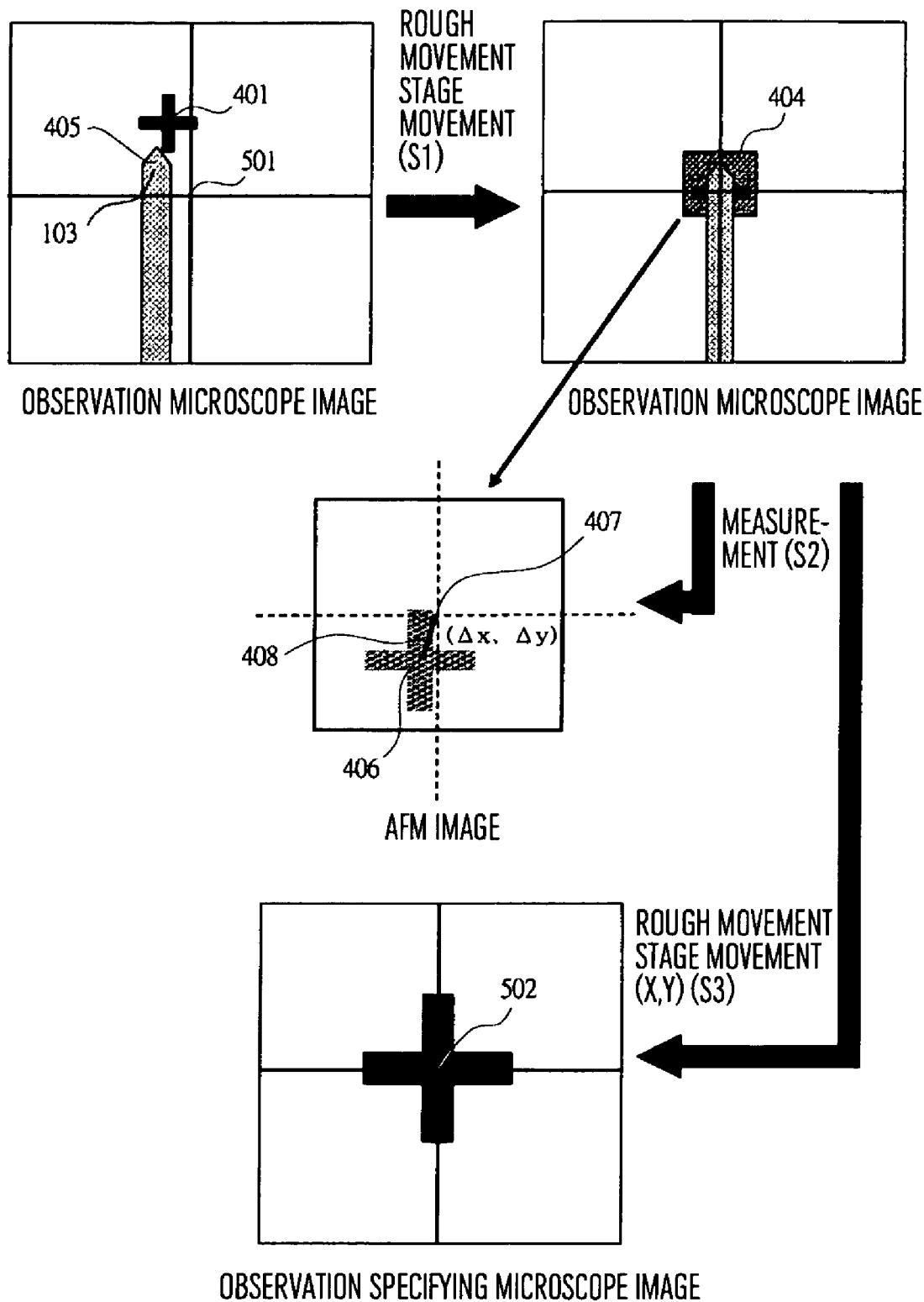
FIG. 29 is an explanatory view showing a distance measurement (calibration) method of a cantilever probe and a measurement area specifying microscope in an embodiment of the invention.

FIG. 29 is an explanatory view showing the distance measurement method of the probe 103 of the cantilever and the measurement area specifying microscope 117.

First, the sample on which the crisscross pattern is depicted and which is explained about calibration between two cantilevers is prepared and the sample observation portion 105 of the microscope, etc, and the rough movement stage 101 are moved so that the center 501 of the observation microscope image and the estimation position 405 of the cantilever probe are coincident with the center of the crisscross pattern (processing S1).

Here, the measurement area 404 is set with the probe position under this condition as the center and the crisscross pattern is measured by the atomic force microscope (AFM) (processing S2).

In this case, when the center 406 of the crisscross patter and the center 405 of the cantilever probe 103 are coincident, the center 406 of the crisscross pattern measured coincides with the center 407 of the measurement image but when the center 406 of the crisscross pattern does not coincide with the center of the probe, deviation (Δx, Δy) indicated by 408 in FIG. 29 takes place at the center 407 of the measurement image and the center position of the crisscross mark.

The deviation amount 408 is measured by image processing, etc, and the position of the microscope is moved by this distance. Because the center of the observation microscope and the center of the crisscross pattern are aligned on a line in the Z axis direction at this time, the rough movement stage is moved at this time so that the center of the crisscross pattern and the image center 502 of the measurement area specifying microscope 117 coincide with each other (processing S3).

At this time, the moving distances (X, Y) and (Δx, Δy) of the X and Y respective directions are the distances between the probe positions 103 of the cantilevers and the measurement area specifying microscope 117 and the positional relation between the probe 103 of the cantilever and the measurement area specifying microscope 117 can be measured by conducting the operation described above after the exchange of the probe.

By this measurement of the measurement area specifying image, measurement of a broad area inclusive of the measurement area is conducted within a short time and the position of the pattern to be measured is decided from the resulting image.

However, in the system where the measurement area specifying probe 104 and the CD/sectional profile measurement probe 103 are separately prepared, the position decided hereby is the coordinate system in the measurement area specifying probe 104. Therefore, the distances corresponding to the distances between the tips of the probes in the X and Y directions that are first determined by calibration by using this position as the origin are offset and the CD/sectional profile measurement is made by using a probe separate from the probe used for the observation image measurement.

As for the measurement mode of the CD/sectional profile measurement, the method disclosed in JP-A-11-352135 that oscillates the cantilever near the resonance frequency and intermittently brings it into contact with the sample to measure the surface shape and the method disclosed in JP-A-2001-33373 that repeats approach/retraction of the probe to and from the sample to bring the probe into intermittent contact with the sample and measures the surface shape (see FIG. 15(*a*) are known besides the non-contact and contact modes.

However, because the radius of the tip of the probe becomes gradually greater with the progress of wear of the probe, the probe does not reach the pit bottom of the pattern and measurement accuracy drops. Particularly when a pattern having a high aspect ratio is measured, therefore, the probe must be exchanged at an early stage. It is therefore necessary to monitor the wear condition of the probe and to judge the exchange timing of the probe.

Distortion of the measurement image resulting from the difference of the probe shape cannot be neglected even when wear of the probe is small. Therefore, it becomes necessary to monitor the distortion and to reduce the influence of the difference of the probe condition.

Next, the monitor method of wear of the probe is explained.

Figure 30:
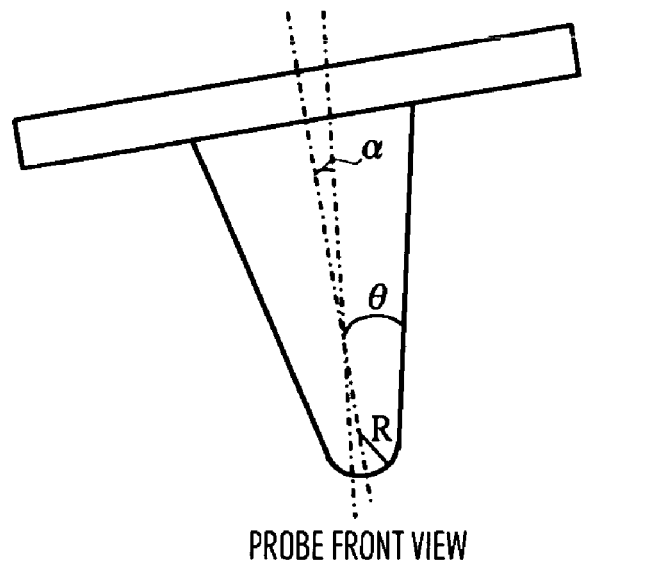
FIG. 30 is an explanatory view showing probe condition parameters of a probe shape monitor and a standard sample in an embodiment of the invention.
Figure 30:
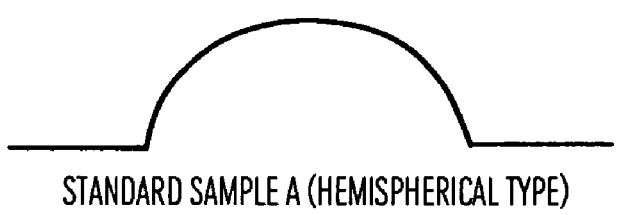
Figure 30:
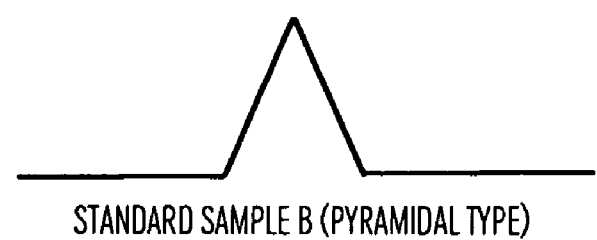
Figure 30:
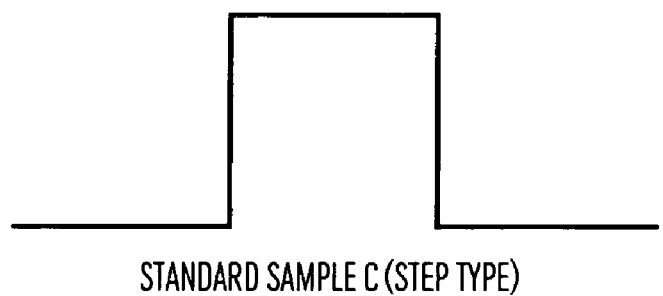
Figure 31:
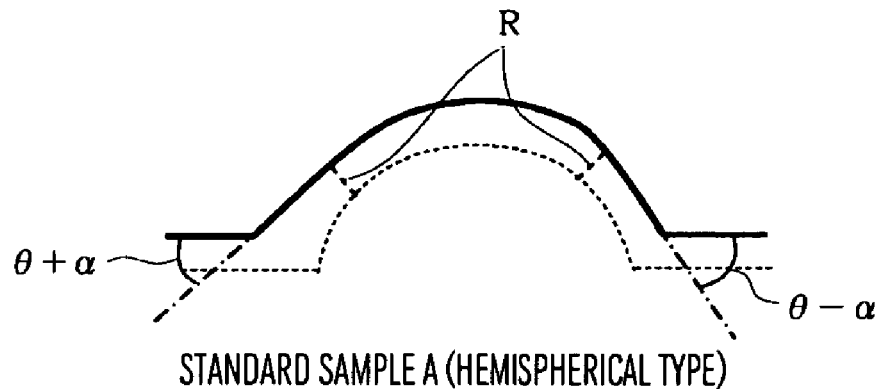
FIG. 31 is an explanatory view showing a measurement profile by arbitrary probe condition parameters and the standard sample in an embodiment of the invention.
Figure 31:
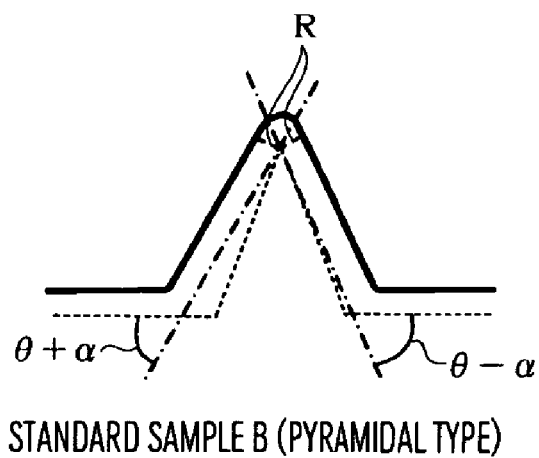
Figure 31:
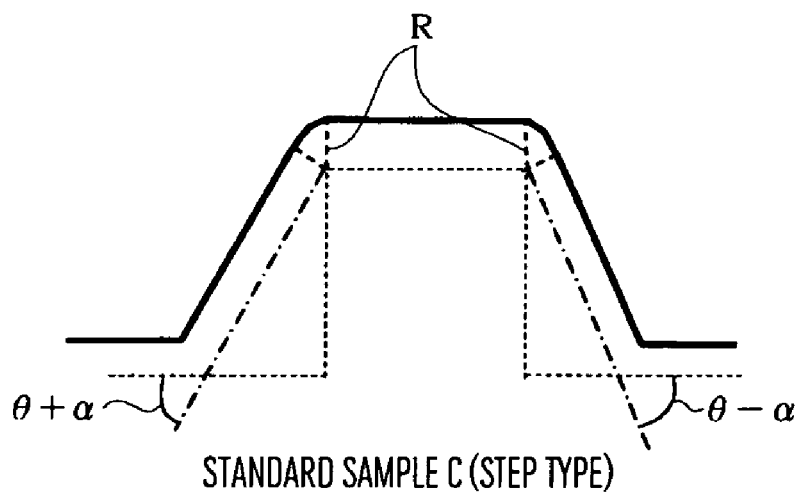
Figure 32:
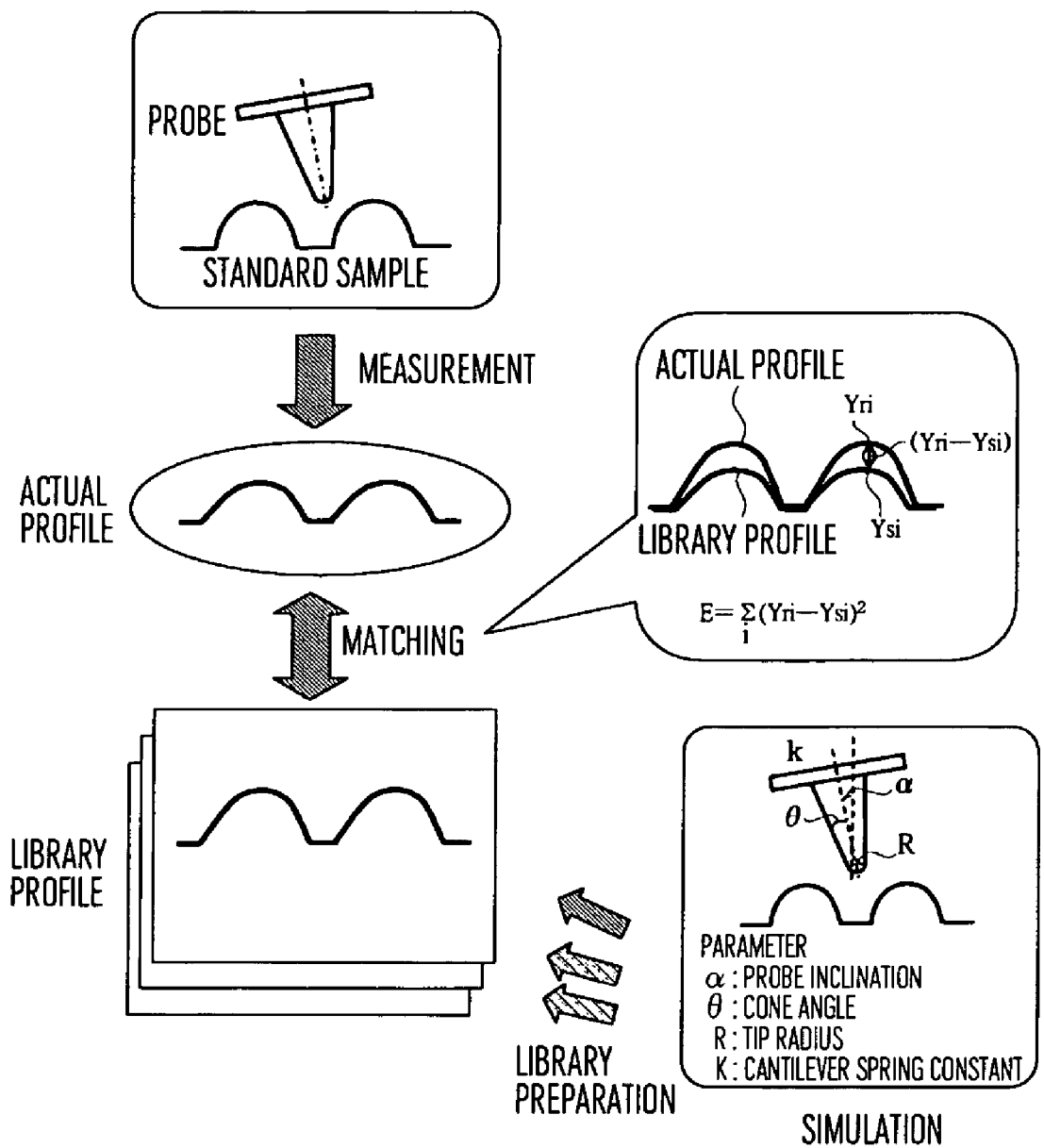
FIG. 32 is an explanatory view showing a probe shape matching method in an embodiment of the invention.

FIG. 30 is an explanatory view showing a probe condition parameter of the probe shape monitor and a standard sample. FIG. 31 is an explanatory view showing an arbitrary probe condition parameter and a measurement profile using the standard sample. FIG. 32 is an explanatory view showing a method of probe shape matching.

First, a method of measuring a standard sample whose shape is known in advance is used as the monitor method of the probe shape. Because the measurement profile is convolution of the sample shape and the probe shape, this method measures the standard sample having a known shape and specifies the probe shape from its measurement profile.

The shape of the standard sample in this case is of a hemispherical type such as a micro-lens array, a pyramidal type that can be fabricated by utilizing anisotropic etching of Si and a step type of line-and-space. The measurement profile shown in FIG. 31 can be obtained from the probe condition (inclination α of probe, tip radius R, cone angle θ) and each standard sample shape shown in FIG. 30.

In this case, the probe condition (inclination α of probe, tip radius R, cone angle θ) shown in FIG. 30 can be specified from the inclination of both right and left edges of the measurement profile and the height of the upper surface as shown by the measurement profile in FIG. 31. Therefore, the standard sample is in advance measured by the cantilever before use and is again measured after the CD/sectional profile measurement. In this way, the wear amount of the probe tip due to the measurement becomes possible.

However, when the cantilever is soft and the inclination of the cantilever is great, twist of the cantilever by the push force of the cantilever to the sample cannot be neglected. Therefore, distortion of the measurement profile that depends on the spring constant of the cantilever, the inclination of the probe to the sample and the push force of the probe to the sample must be afresh taken into consideration. In this case, distortion due to twist of the cantilever occurs in the measurement profile in FIG. 31 and it becomes difficult to directly specify the probe condition from the sectional profile.

Therefore, as the method of specifying the probe shape in this case, the method that works out in advance a measurement profile library obtained from the probe condition and each standard sample as shown in FIG. 32 and searches matching between the library profile and the standard sample actual measurement profile becomes effective.

The library in this case is created by determining through simulation the measurement profile from an arbitrary probe shape decided by the probe shape parameter described above and the standard sample shape and matching uses a method that uses the balance square sum of the library profile and measurement profile point as an evaluation function and determines the library profile at which the evaluation function reaches minimum.

It becomes possible by using the probe shape specified by this method to correct (de-convolution) the CD value and the sectional profile measured. Therefore, the standard sample described above is mounted as a calibration sample to each apparatus as a standard specification and the probe condition is inspected immediately before the measurement or periodically (one/several measurements, for example). As a result, a high precision image from which the influences of the probe are removed can always be acquired.

The flow of a series of the CD measurement steps explained above is explained by using FIG. 33.

Figure 33:
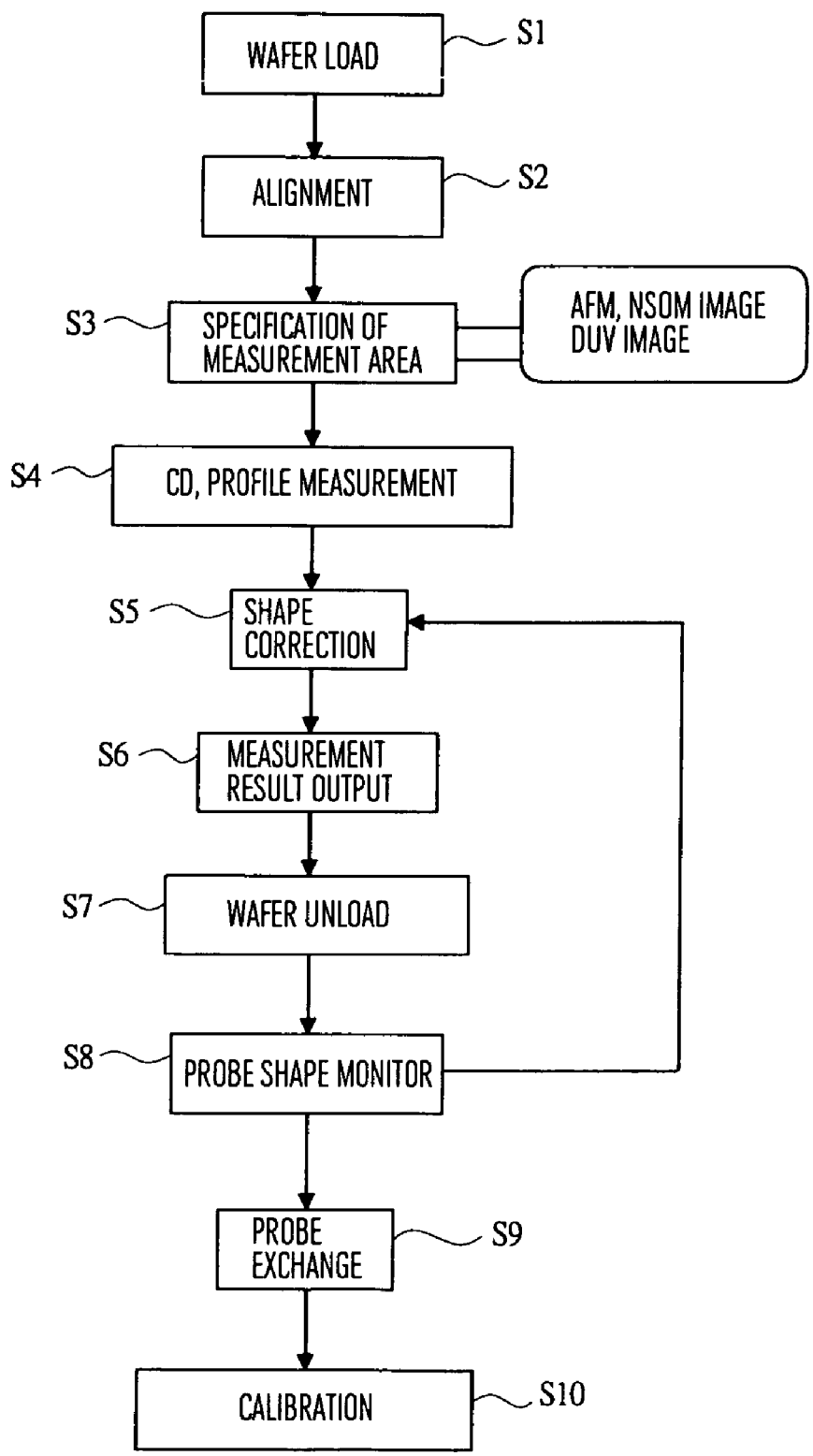
FIG. 33 is a flowchart showing the flow of processing of CD measurement in an embodiment of the invention.

FIG. 33 is a flowchart showing the flow of the series of the CD measurement in this embodiment.

First, a wafer as the measurement object is loaded from the load port 119 shown in FIG. 25 to the rough movement stage 101 (S1). After the wafer loaded is subjected to alignment (positioning) (S2), the measurement area is specified by the method described above (S3).

The CD/sectional profile measurement is made for the area specified by S3 (S4) and the measurement shape correction 108 executes correction (de-convolution) (S5). The result is displayed on the image display portion (S6).

The result is outputted to the outside such as a printer, a floppy (R), a disk, an MO, etc, whenever necessary; and the measured wafer is unloaded (S7).

Further, the shape of the CD/sectional profile measurement probe is monitored (S8) by using the standard sample 114 mounted to the apparatus and the probe is exchanged in accordance with the wear condition (S9).

After the exchange of the probe, measurement (calibration) of the distance between the two probes or the distance between the probe and the measurement area specifying microscope is made (S10) as explained above.

The CD/sectional profile of the semiconductor pattern on the wafer can be measured highly accurately by repeating the operations described above.

Next, a semiconductor device production method using the CD/sectional profile measurement method of this embodiment is explained.

FIG. 11 is an explanatory view showing the semiconductor device production method using the CD/sectional profile measurement method of this embodiment.

In the drawing, a semiconductor device production apparatus is constituted by a process apparatus 1003 such as an exposing device, a developing device, an etcher, etc, and an apparatus 1002 for executing the CD/sectional shape profile measurement method of this embodiment. The pattern is formed on a wafer 1001.

First, the patterns are formed on the wafer 1001 through a plurality of process apparatuses 1003. The patterns are formed and the CD/sectional profile measurement of the pattern is made by the apparatus 1002 by using an inspection wafer 1006 sampled out for inspection. The measurement result is fed back as feedback information 1005 to the process condition of each process apparatus.

The high precision devices can be produced stably by changing the process condition of each process apparatus 1003 by using the high precision measurement result of the CD/sectional profile measurement of this embodiment.

Incidentally, in this embodiment, the shape of the semiconductor pattern is measured by using the atomic force microscope (AFM) as one of the scanning probe microscopes. However, the invention is not limited to the atomic force microscope (AFM) but can also be applied to other scanning probe microscopes that measure the surface shape of the sample of the measurement object by scanning the probe by bringing it close to, or into contact with, the sample surface of the measurement object and measuring the physical interaction occurring between the probe and the sample.

In this embodiment, the explanation is made as the construction of the atomic force microscope (AFM) on the following assumption. Namely, processing of the data and the signals are executed by the signal detection portion 106, the data processing portion 107, the measurement shape correction portion 108 and the probe condition detection portion 121 and control of the probe is made by the scan control portion 109, the probe control portion 110, the overall control portion 111, the measurement area specifying portion 122 and the distance measurement portion 123. However, this construction is an example and the invention is not limited thereto. The construction may be constituted by an integral processing control portion, or may be any construction as long as it can operate each portion.

According to the invention, the advantages that high speed approach between the sample and the probe can be accomplished by providing the high sensitivity proximity sensor and through-put of measurement can be improved. According to the invention, another effect can be obtained in that the probe is intermittently brought into contact with the sample but is prevented from being dragged on the sample, and high speed scan of the sample can be accomplished while accomplishing high precision measurement for a soft and brittle material or a pattern having a steep step.

According to the invention, another effect can be obtained in that measurement of an accurate shape of a step portion can be accomplished by scanning the probe while it is kept inclined with respect to the sample step portion having a steep inclination.

Because the semiconductor pattern can be measured with high through-put according to the invention, high precision devices can be produced stably.

Because an optical recording media pattern can be measured with high through-put according to the invention, high precision recording media can be produced stably.

According to the invention, the measurement area specifying means specifies the measurement area of the sample on the basis of the scanning probe microscope image, near-UV range microscope image or far-UV range microscope image of the sample surface, and the measurement shape correction means corrects the measurement result of the sample surface on the basis of the condition of the probe. Because the fine pattern resolution of which has not been possible by the optical microscopes of the prior art can be accurately positioned in the measurement area, there can be obtained the effect that efficiency of specifying the measurement area can be improved at the time of measurement of fine patterns of 100 nm or below for which requirement for the measurement will increase.

The condition of the probe is detected during measurement or periodically, distortion of the measurement image resulting from the probe shape or the probe wear is corrected and the high precision measurement result having high reproducibility can be obtained. Therefore, the invention contributes to the improvement of through-put when the scanning probe microscope is used for the CD/sectional profile measurement in the semiconductor production line, etc, and to high precision measurement.

Though the explanation given above has been described about the embodiments, it would be obvious to those skilled in the art that the invention is not limited thereto and various modifications and corrections could be made within the spirit and scope of the appended claims.

The invention claimed is:

1. A scanning probe microscope for observing a surface shape of a sample, comprising:
    sample table for supporting said sample put on said sample table;
    a probe;
    a probe holder to support said probe;
    a driving mechanism to drive said probe in a height direction with respect to said sample put on said sample table;
    a deflection detection sensor to detect a deflection amount of said probe;
    a controller to control said driving mechanism; and
    a processor to acquire a surface shape image of said sample by using deflection information of said probe detected by said deflection detection sensor;
    wherein said controller drives said probe by said driving mechanism to repeat approach/retraction with respect to said sample for each measurement point and controls the retraction amount by using the deflection information of said probe, and
    wherein said controller is configured to retract said probe with respect to said sample and, after detecting a transition from a state that said probe is adhered to said sample to a state that said probe is at a neutral position, an operation is carried out that includes stopping retraction of the probe and starting the probe to approach, with respect to said sample, toward the next measurement point to be executed.

2. A scanning probe microscope according to claim 1, wherein the deflection detection sensor further comprises an objective lens, and wherein the deflection information of said probe is detected through said objective lens.

3. A scanning probe microscope according to claim 1, wherein said deflection detection sensor further comprises a twist detection sensor to detect twist of said probe and said controller drives said probe by said driving mechanism to a height greater than a retraction amount of the sample using a signal detected by said twist detection sensor.

4. An observation method of a sample by use of a scanning probe microscope according to claim 1, wherein information such as surface elasticity characteristics, electric capacitance characteristics, and electrical resistance characteristics of said sample is acquired in addition to the surface shape image of said sample.

5. A scanning probe microscope according to claim 1, wherein said deflection detection sensor further comprises a sensor to detect capacitance change between said sample and said probe, air pressure change, or light amount change of near field light, wherein said controller drives said probe by said driving mechanism to a height greater than a step of said sample before said probe touches a sidewall of the step of said sample, using signal detected by said sensor to detect capacitance change between said sample and said probe, air pressure change, or light value change of near field light.

6. A scanning probe microscope according to claim 1, wherein said controller further comprises a signal shape to reshape a deflection amount signal of said probe by said deflection detection sensor, wherein said controller performs at least one of correction processes that correct interference between height and the deflection amount signal of said probe, change by time of neutral point of the detected deflection amount signal, and control gain of height of said probe when said probe was driven.

7. A scanning probe microscope for observing a surface of a sample according to the claim 1, wherein said operation is executed by the controller in response to detecting the transition from a state that said probe is adhered to said sample to a state that said probe is at a neutral position.

* * * * *